US010245545B2

(12) United States Patent
Hara et al.

(10) Patent No.: US 10,245,545 B2
(45) Date of Patent: Apr. 2, 2019

(54) EMBOSSED AIR FILTER FILTRATION MEDIUM, FILTER PACK, AIR FILTER UNIT, AND METHOD FOR MANUFACTURING FILTRATION MEDIUM FOR EMBOSSED AIR FILTER

(71) Applicant: DAIKIN INDUSTRIES, LTD., Osaka-shi, Osaka (JP)

(72) Inventors: Satoshi Hara, Settsu (JP); Kunihiko Inui, Settsu (JP); Li Bao, Yuki (JP); Makoto Kobayashi, Yuki (JP); Hitoshi Niinuma, Yuki (JP)

(73) Assignee: Daikin Industries, Ltd., Osaka (JP)

( * ) Notice: Subject to any disclaimer, the term of this patent is extended or adjusted under 35 U.S.C. 154(b) by 345 days.

(21) Appl. No.: 15/031,438

(22) PCT Filed: Oct. 22, 2014

(86) PCT No.: PCT/JP2014/078145
§ 371 (c)(1),
(2) Date: Apr. 22, 2016

(87) PCT Pub. No.: WO2015/060364
PCT Pub. Date: Apr. 30, 2015

(65) Prior Publication Data
US 2016/0236132 A1 Aug. 18, 2016

(30) Foreign Application Priority Data
Oct. 23, 2013 (JP) .................................. 2013-220080

(51) Int. Cl.
*B01D 53/02* (2006.01)
*B01D 46/52* (2006.01)
(Continued)

(52) U.S. Cl.
CPC ....... *B01D 46/522* (2013.01); *B01D 39/1623* (2013.01); *B01D 39/1692* (2013.01);
(Continued)

(58) Field of Classification Search
CPC ........ B01D 2239/0654; B01D 39/1623; B01D 39/1692; B01D 46/522; B01D 46/523;
(Continued)

(56) References Cited

U.S. PATENT DOCUMENTS 7,311,880 B2 * 12/2007 Perman ............... B01L 3/50255
422/267
8,597,393 B2 12/2013 Morita et al.
(Continued)

FOREIGN PATENT DOCUMENTS

EP 2 657 291 A1 10/2013
EP 2 752 231 A1 7/2014
(Continued)

OTHER PUBLICATIONS

International Preliminary Report of corresponding PCT Application No. PCT/JP2014/078145 dated May 6, 2016.
(Continued)

*Primary Examiner* — Christopher P Jones
(74) *Attorney, Agent, or Firm* — Global IP Counselors, LLP

(57) ABSTRACT

An embossed air filter filtration medium has at least one porous film and a plurality of air-permeable support materials supporting the at least one porous film. The least one porous film includes a fibril-formable polytetrafluoroethylene, a non-fibril-forming and non-hot-melt-processable component, and a non-fibril-forming and hot-melt-processable component having a melting point below 320° C. Surfaces of both sides of the air filter filtration medium are formed by two air-permeable support materials of the air-
(Continued)

permeable support materials. The air filter filtration medium has a plurality of embossed projections. The embossed air filter filtration medium may be part of a filter pack, which may be part of an air filter unit. The embossed air filter filtration medium is manufactured by laminating air-permeable support materials on the at least one porous film and embossing the air filter filtration medium to form the projections.

17 Claims, 7 Drawing Sheets

(51) Int. Cl.
B01D 39/16 (2006.01)
B01D 46/00 (2006.01)
C08L 27/18 (2006.01)

(52) U.S. Cl.
CPC ....... B01D 46/0001 (2013.01); B01D 46/523 (2013.01); C08L 27/18 (2013.01); B01D 2239/0654 (2013.01); C08L 2205/025 (2013.01); C08L 2205/03 (2013.01)

(58) Field of Classification Search
CPC . C08L 2205/025; C08L 2205/03; C08L 27/18
USPC ........................................................ 55/486
See application file for complete search history.

(56) References Cited

U.S. PATENT DOCUMENTS

| 9,242,201 | B2 | 1/2016 | Bao et al. |
| 9,707,504 | B2* | 7/2017 | Chaen .................... B32B 27/322 |
| 2002/0155034 | A1* | 10/2002 | Perman ............... B01L 3/50255 |
| | | | 422/69 |
| 2014/0130470 | A1* | 5/2014 | Mori ...................... B01D 69/02 |
| | | | 55/497 |
| 2014/0196840 | A1* | 7/2014 | Ishii ....................... B01D 71/36 |
| | | | 156/244.11 |
| 2014/0248585 | A1* | 9/2014 | Yang ...................... A61L 27/16 |
| | | | 433/215 |

FOREIGN PATENT DOCUMENTS

| JP | 2013-52321 A | 3/2013 |
| WO | 2010/073451 A1 | 7/2010 |
| WO | 2012/086710 A1 | 6/2012 |
| WO | 2013/031228 A1 | 3/2013 |

OTHER PUBLICATIONS

International Search Report of corresponding PCT Application No. PCT/JP2014/078145 dated Feb. 10, 2015.
European Search Report of corresponding EP Application No. 14 85 5774.7 dated Apr. 25, 2017.

* cited by examiner

EMBOSSED AIR FILTER FILTRATION MEDIUM, FILTER PACK, AIR FILTER UNIT, AND METHOD FOR MANUFACTURING FILTRATION MEDIUM FOR EMBOSSED AIR FILTER

CROSS-REFERENCE TO RELATED APPLICATIONS

This U.S. National stage application claims priority under 35 U.S.C. § 119(a) to Japanese Patent Application No. 2013-220080, filed in Japan on Oct. 23, 2013, the entire contents of which are hereby incorporated herein by reference.

TECHNICAL FIELD

The present invention relates to an embossed air filter filtration medium, a filter pack, an air filter unit, and a method for manufacturing an embossed air filter filtration medium.

BACKGROUND ART

PTFE porous films fabricated by stretching of polytetrafluoroethylene have higher trapping efficiency, for the same level of pressure loss, than do filtration media made from glass fibers, and are therefore particularly favorable for use in high efficiency particulate air (HEPA) filters and ultra low penetration air (ULPA) filters.

While filtration media made from glass fibers have been employed as HEPA filters in the past, a problem in doing so is that filtration media made from glass fibers have high pressure loss. Accordingly, there have been proposed filtration media for air filters employing the aforedescribed PTFE porous films as the filtration medium, in order to achieve less pressure loss than conventional filtration media made from glass fibers.

However, whereas PTFE porous films have low pressure loss, due to the low mechanical strength of PTFE, the film structure is prone to rupture when subjected to external forces, and pressure loss tends to rise as a result. Such external force might include, for example, compressive forces acting on the PTFE porous film in the thickness direction when the PTFE porous film is layered on an air-permeable support material to fabricate a filtration medium.

Typically, in order to ensure a wide filtration medium area, filtration media for air filters are shaped into a zigzag configuration by a pleating process involving the creation of alternating mountain folds and valley folds, and are employed in the form of an air filter unit retained in a frame. In order to ensure channels for air in a filtration medium assembled into an air filter unit, it is necessary to maintain spacing between neighboring mountain fold sections or valley fold sections (pleat spacing). In a conventional air filter unit, with a view to reducing weight and the like, rather than employing separate members such as spacers, it is known to emboss the filtration medium to furnish the medium with a plurality of projections, so that the filtration medium retains the zigzag configuration (for example, see Japanese Laid-open Patent Application No. 2013-52321 and International Patent Application No. 2010/073451). According to the embossed filtration media disclosed in Japanese Laid-open Patent Application No. 2013-52321 and International Patent Application No. 2010/073451, pleat spacing is maintained through contact between embossed projections, which are respectively furnished to two opposing surfaces facing one another across mountain folds or valley folds.

SUMMARY

Technical Problem

Embossing is carried out, for example, using a pair of dies having a plurality of protrusions and depressions on their surface, the filtration medium being pressed so as to be sandwiched from both sides. However, due to the low mechanical strength mentioned previously, with a PTFE porous film, the film structure is prone to being crushed in the course of such an embossing process, and the pressure loss tends to increase.

An object of the present invention is to provide an embossed air filter filtration medium, a filter pack, and an air filter unit, with which the rise in pressure loss associated with the embossing process is minimized; and a method for manufacturing an embossed air filter filtration medium, with which the rise in pressure loss associated with the embossing process is minimized.

Solution to Problem

As a result of painstaking research directed to solving the aforementioned problem, the inventors perfected the present invention upon discovering that the rise in pressure loss is minimized where the embossing process is carried out on an air filter filtration medium provided with a porous film that includes, as porous-film-forming components, a fibril-formable polytetrafluoroethylene, a non-fibril-forming and non-hot-melt-processable component, and a non-fibril-forming and hot-melt-processable component having a melting point below 320° C.

Specifically, the present invention is an embossed air filter filtration medium for trapping dust in a stream of air, characterized by having an air filter filtration medium provided with one or a plurality of porous films that include a fibril-formable polytetrafluoroethylene, a non-fibril-forming and non-hot-melt-processable component, and a non-fibril-forming and hot-melt-processable component having a melting point below 320° C., and a plurality of air-permeable support materials supporting the porous film, the surfaces of both sides of the air filter filtration medium being formed by two air-permeable support materials among the plurality of air-permeable support materials, and the air filter filtration medium being furnished with a plurality of projections by undergoing an embossing process.

According to the aspect of the invention described above, there are no particular limitations as to the arrangement by which "the surfaces of both sides of the air filter filtration medium are formed by two air-permeable support materials among the plurality of air-permeable support materials"; any arrangement in which the surfaces of at least both sides of the air filter filtration medium being respectively constituted by air-permeable support materials is acceptable. An arrangement in which a plurality of porous films constitute the interior which has been sandwiched between the two air-permeable support materials constituting both surfaces of the air filter filtration medium is acceptable, and in cases in which a plurality of porous films constitute the interior which has been sandwiched between the two air-permeable support materials constituting both surfaces of the air filter filtration medium, an additional air-permeable support material or materials may be furnished between these plurality of porous films in the interior.

Another aspect of the present invention is a filter pack characterized by comprising the embossed air filter filtration medium according to the aforedescribed aspect, the embossed air filter filtration medium being folded using alternate mountain folding and valley folding so as to assume a zigzag configuration.

There are no particular limitations as to the "filter pack," which has a zigzag configuration produced by alternate folding into mountain folds and valley folds, and not, for example, a flat sheet shape; and may be shaped to permit accommodation within any frame.

Another aspect of the present invention is an air filter unit, characterized by comprising a filter pack, and a frame for retaining the filter pack, the filter pack being sealed in the frame through the agency of a sealant.

Another aspect of the present invention is a method for manufacturing an embossed air filter filtration medium adapted to trap microparticles in a stream of air, characterized by including:

(a) a step for obtaining one or a plurality of porous films that include a fibril-formable polytetrafluoroethylene, a non-fibril-forming and non-hot-melt-processable component, and a non-fibril-forming and hot-melt-processable component having a melting point below 320° C.;

(b) a step for laminating air-permeable support materials on the porous film and fabricating an air filter filtration medium, the surfaces of both sides of the air filter filtration medium being formed by the air-permeable support materials; and (c) a step for carrying out an embossing process and forming a plurality of projections on the air filter filtration medium.

According to the aspect of the invention described above, there are no particular limitations as to the arrangement by which "the surfaces of both sides of the air filter filtration medium are formed by the air-permeable support materials," and any arrangement in which the surfaces of at least both sides of the air filter filtration medium are respectively constituted by air-permeable support materials is acceptable; an arrangement in which a plurality of porous films make up the interior which has been sandwiched between the two air-permeable support materials constituting both surfaces of the air filter filtration medium is acceptable, and in cases in which a plurality of porous films make up the interior which has been sandwiched between the two air-permeable support materials constituting both surfaces of the air filter filtration medium, an additional air-permeable support material or materials may be furnished between these plurality of porous films in the interior.

Advantageous Effects of Invention

According to the present invention, there are obtained an embossed air filter filtration medium, a filter pack, and an air filter unit, with which any rise in pressure loss associated with the embossing process is minimized. According to the method for manufacturing an embossed air filter filtration medium of the present invention, there is obtained an embossed air filter filtration medium with which the rise in pressure loss associated with the embossing process is minimized.

DESCRIPTION OF EMBODIMENTS

An embossed air filter filtration medium, a filter pack, an air filter unit, and a method for manufacturing an embossed air filter filtration medium according to the present invention are described below.

(Filtration Medium for Embossed Air Filter)

Figure 1:
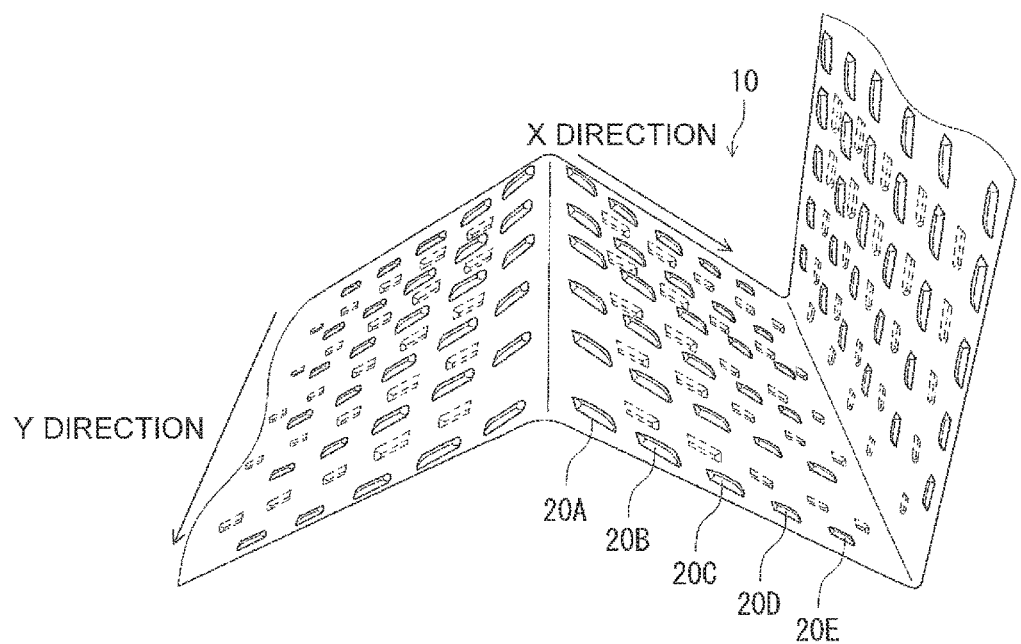
FIG. 1 is an exterior perspective view of an embossed air filter filtration medium of the present embodiment.
Figure 2:
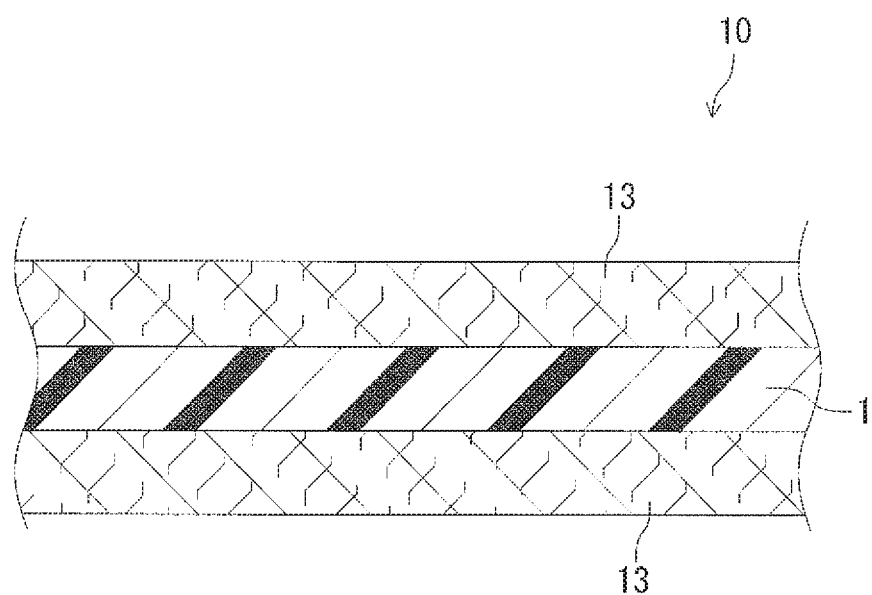
FIG. 2 is a cross sectional view showing the layer configuration of the filtration medium of the present embodiment.

FIGS. 1 and 2 show an embossed air filter filtration medium (hereinafter also called simply "filtration medium") 10 of the present embodiment. FIG. 1 is an exterior perspective view of the filtration medium 10, and FIG. 2 is a cross sectional view showing the layer configuration of the filtration medium 10.

The filtration medium 10 of the present embodiment is an embossed air filter filtration medium for trapping dust in a stream of air, and is provided with a porous film 1 that includes a fibril-formable polytetrafluoroethylene (also termed "component A"), a non-fibril-forming and non-hot-melt-processable component (also termed "component B"), and a non-fibril-forming and hot-melt-processable component having a melting point below 320° C. (also termed "component C"), and with two air-permeable support materials 13 that support the porous film 1 and constitute the surfaces of both sides of the filtration medium 10, the filtration medium 10 being furnished with a plurality of projections 20A-20E by being embossed. In the present description, "projections" refer to sections that, when the filtration medium is seen in plan view, appear surrounded by flat areas of the filtration medium surface, and are areas of protrusion or depression with respect to the flat areas; "embossing process" refers to the formation of these projections.

As shown in FIG. 2, the filtration medium 10 is constituted by the porous film 1 and the two air-permeable support materials 13 laminated to both sides of the porous film 1. Optionally, the filtration medium may be provided with two or more porous films. Where two porous films are provided, the filtration medium may be one having a five-layer structure in which the two porous films and three air-permeable support materials are laminated in alternating fashion, or the filtration medium may be one having a four-layer structure in which the two porous films are superimposed directly and air-permeable support materials are laminated to both sides thereof.

The porous film 1 is obtained by a stretching process of a sheet fabricated using the aforedescribed three components A to C. The porous film 1 has a film structure having fibrils produced during the stretching process, and nodes connected to the fibrils. Of the components A to C, the fibrils are constituted mainly from component A, and the nodes are constituted from components A to C. Within the porous film 1, these nodes are formed relatively large, whereby the porous film 1 is formed to a greater thickness than in the prior art. Moreover, the nodes are relatively hard due to containing the non-fibril-forming and hot-melt-processable component, and function like pillars supporting the porous film 1 in the thickness direction, whereby reduced filter performance due to compressive force or the like experienced by the porous film 1 during the embossing process and/or subsequent steps such as lamination of the air-permeable support materials 13 can be minimized. Each of the components A to C will now be described.

(a) Fibril-Formable Polytetrafluoroethylene

The fibril-forming PTFE is, for example, a high-molecular weight PTFE obtained by emulsion polymerization or suspension polymerization of tetrafluoroethylene (TFE). By "high molecular weight" is meant a molecular weight of such magnitude that fibril formation readily occurs in the course of stretching during porous film fabrication, and fibrils of extended length are obtained; the standard specific gravity (SSG) is 2.130-2.230; and due to the high melt viscosity, there is substantially no melt flow by the material. In terms of ease of fibril formation and obtaining fibrils of extended length, the SSG of the fibril-forming PTFE is preferably 2.130-2.190, and more preferably 2.140-2.170. When the SSG is too high, there is a risk that the mixture of the components A to C which is the starting material for the porous film 1 will have poor stretchability, whereas when the SSG is too low, there is a risk of poor rollability, poor homogeneity of the porous film, and high pressure loss of the porous film. Also, in terms of ease of fibril formation and obtaining fibrils of extended length, the PTFE is preferably one obtained through emulsion polymerization. The standard specific gravity (SSG) is measured in accordance with ASTM D 4895.

The presence or absence of the fibril-forming property, i.e., whether or not the material is able to form fibrils, can be determined based on whether paste extrusion, which is the typical method for molding of high-molecular weight PTFE powders made from polymers of TFE, is possible. Normally, the reason that paste extrusion of a material is possible is that the high-molecular weight PTFE has fibril-forming properties. In cases in which an unbaked molded body obtained by paste extrusion has no substantial strength and/or stretch, e.g., cases in which a material has 0% stretch and severs when pulled, the material may be considered to lack fibril-forming ability.

The aforementioned high-molecular weight PTFE may be a modified polytetrafluoroethylene (hereinafter termed "modified PTFE"), a homo-polytetrafluoroethylene (hereinafter termed "homo-PTFE"), or a mixture of modified PTFE and homo-PTFE. There are no particular limitations as to the homo-PTFE, and the homo-PTFE disclosed inter alia in Japanese Laid-open Patent Application No. 53-60979, Japanese Laid-open Patent Application No. 57-135, Japanese Laid-open Patent Application No. 61-16907, Japanese Laid-open Patent Application No. 62-104816, Japanese Laid-open Patent Application No. 62-190206, Japanese Laid-open Patent Application No. 63-137906, Japanese Laid-open Patent Application No. 2000-143727, Japanese Laid-open Patent Application No. 2002-201217, International Patent Application No. 2007/046345, International Patent Application No. 2007/119829, International Patent Application No. 2009/001894, International Patent Application No. 2010/113950, and International Patent Application No. 2013/027850 can be used to good advantage. Of these, homo-PTFE having high stretching properties, such as those disclosed inter alia in Japanese Laid-open Patent Application No. 57-135, Japanese Laid-open Patent Application No. 63-137906, Japanese Laid-open Patent Application No. 2002-143727, Japanese Laid-open Patent Application No. 2002-201217, International Patent Application No. 2007/046345, International Patent Application No. 2007/119829, and International Patent Application No. 2010/113950 are preferred.

Modified PTFE comprises TFE and monomers other than TFE (hereinafter termed "modifying monomers"). As modified PTFE there may be cited materials uniformly modified by modifying monomers, those modified in the initial phase of the polymerization reaction, those modified in the final phase of the polymerization reaction, and the like, with no particular limitations. The modified PTFE disclosed, for example, inter alia in Japanese Laid-open Patent Application No. 60-42446, Japanese Laid-open Patent Application No. 61-16907, Japanese Laid-open Patent Application No. 62-104816, Japanese Laid-open Patent Application No. 62-190206, Japanese Laid-open Patent Application No. 64-1711, Japanese Laid-open Patent Application No. 2-261810, Japanese Laid-open Patent Application No. 11-240917, Japanese Laid-open Patent Application No. 11-240918, International Patent Application No. 2003/033555, International Patent Application No. 2005/061567, International Patent Application No. 2007/005361, International Patent Application No. 2011/055824, and International Patent Application No. 2013/027850 can be used to good advantage. Of these, modified PTFE having high stretching properties, such as those disclosed inter alia in Japanese Laid-open Patent Application No. 61-16907, Japanese Laid-open Patent Application No. 62-104816, Japanese Laid-open Patent Application No. 64-1711, Japanese Laid-open Patent Application No. 11-240917, International Patent Application No. 2003/033555, International Patent Application No. 2005/061567, International Patent Application No. 2007/005361, and International Patent Application No. 2011/055824 are preferred.

The modified PTFE includes TFE units based on TFE, and modifying monomer units based on a modifying monomer. The modifying monomer units are sections which are part of the molecular structure of the modified PTFE, and which are derived from the modifying monomer. The modified PTFE preferably includes modifying monomer units at a level equivalent to 0.001-0.500 wt %, and more preferably 0.01-0.30 wt %, of all monomer units. All monomer units refer to sections derived from all of the monomers in the molecular structure of the modified PTFE.

There are no particular limitations as to the modifying monomer other than the ability to copolymerize with TFE; for example, there may be cited perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ether; perfluoroalkyl ethylene (PFAE), ethylene, and the like. A single type of modifying monomer, or multiple types, may be employed.

There are no particular limitations as to the perfluorovinyl ether, and perfluoro unsaturated compounds such as those represented by general formula (1) may be cited, for example.

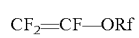  (1)

In the formula, Rf represents a perfluoro organic group.

Herein, a perfluoro organic group refers to an organic group in which all of the hydrogen atoms bonded to the carbon atoms are substituted by fluorine atoms. The aforementioned perfluoro organic group may have an ether oxygen.

As perfluorovinyl ethers, there may be cited, for example, perfluoro(alkyl vinyl ethers) (PAVE) in which Rf in the aforementioned general formula (1) is a C1-10 perfluoroalkyl group. The carbon number of the perfluoroalkyl group is preferably 1 to 5. As perfluoroalkyl groups in PAVE, there may be cited, for example, a perfluoromethyl group, a perfluoroethyl group, a perfluoropropyl group, a perfluorobutyl group, a perfluoropentyl group, a perfluorohexyl group, and the like. Perfluropropyl vinyl ether (PPVE) and perfluoromethyl vinyl ether (PMVE) are preferred PAVE varieties.

There are no particular limitations as to the aforementioned perfluoroalkyl ethylene (PFAE), and there may be cited, for example, perfluorobutyl ethylene (PFBE), perfluorohexyl ethylene (PFHE), and the like.

The modifying monomer in the modified PTFE is preferably at least one selected from the group consisting of HFP, CTFE, VDF, PAVE, PFAE, and ethylene.

From the standpoint of ease of fibril formation and ability to obtain long fibrils in particular, the homo-PTFE preferably contains more than 50 wt % of fibril-forming PTFE.

From the standpoint of maintaining the fibril structure of the porous film 1, the fibril-forming PTFE is preferably contained at a level exceeding 50 wt % of the porous film 1.

(b) Non-Fibril-Forming and Non-Hot-Melt-Processable Component

The non-fibril-forming and non-hot-melt-processable component takes the form of non-fibriform particles unevenly present mainly in the nodes, and has the action of suppressing fibril formation by the fibril-forming PTFE. As the non-fibril-forming and non-hot-melt-processable component, there may be cited, for example, low-molecular weight PTFE or other such component having thermoplasticity, thermosetting resins, and inorganic fillers. The component having thermoplasticity will preferably have a melting point of 320° C. or above, and high melt viscosity. For example, low-molecular weight PTFE, due its high melt viscosity, can remain in nodal areas even during processing at temperatures above the melting point. Herein, low-molecular weight PTFE refers to PTFE having number-average molecular weight of 600,000 or less, a melting point of 320-335° C., and a 380° C. melt viscosity of 100–7.0×10$^5$ Pa·s (see Japanese Laid-open Patent Application No. 10-147617). As methods for manufacturing low-molecular weight PTFE, there may be cited a method in which a high-molecular weight PTFE powder (molding powder) obtained by suspension polymerization of TFE, or a high-molecular weight PTFE powder (fine powder) obtained by emulsion polymerization of TFE, and a specific fluoride are made to undergo a contact reaction under high temperature and thermally decomposed (see Japanese Laid-open Patent Application No. 61-162503), a method in which the aforedescribed high-molecular weight PTFE power or molded article is irradiated with ionizing radiation (see Japanese Laid-open Patent Application No. 48-78252), and a method involving direct polymerization of TFE together with a chain transfer agent (see International Patent Application No. 2004/050727, International Patent Application No. 2009/020187, and International Patent Application No. 2010/114033). Like the fibril-forming PTFE, the low-molecular weight PTFE may be homo-PTFE, or a modified PTFE that includes any of the aforementioned modifying monomers.

Low-molecular weight PTFE lacks fibril-forming properties. The existence or lack of fibril-forming properties is determined by the method mentioned above. Low-molecular weight PTFE, in the form of an unbaked molded body obtained by paste extrusion, has no substantial strength and/or stretch, e.g., having 0% stretch, and severing when pulled.

While there are no particular limitations as to the low-molecular weight PTFE employed in the present invention, one having a 380° C. melt viscosity of 1,000 Pa·s or above is preferred, with 5,000 Pa·s or above being more preferred, and 10,000 Pa·s or above especially preferred. With such high melt viscosity, during manufacture of a porous film, even when the non-fibril-forming and hot-melt-processable component constituting component (C) melts, the non-fibril-forming and non-hot-melt-processable component can remain in the nodes, and fibril-formation can be minimized.

As thermosetting resins, there may be cited, for example, epoxies, silicone resins, polyester, polyurethane, polyimides, phenols, and other such resins. From the standpoint of ease of operation during co-coagulation, discussed below, it is preferable to employ a resin dispersed in water in an uncured state as the thermosetting resin. Such thermosetting resins can all be procured commercially.

As inorganic fillers, there may be cited talc, mica, calcium silicate, glass fibers, calcium carbonate, magnesium carbonate, carbon fibers, barium sulfate, calcium sulfate, and the like. Of these, the use of talc is preferred, from the standpoint of affinity for PTFE and specific gravity. From the standpoint of being able to consistently form a stable dispersion during manufacture of the porous film 1, the inorganic filler used is preferably one having particle diameter of 3-20 μm (particle diameter refers to average particle diameter measured by a laser diffraction/scattering method). These inorganic fillers can all be procured commercially.

The non-fibril-forming and non-hot-melt-processable component is preferably contained at a level of 1-50 wt % of the porous film 1. By keeping the non-fibril-forming and non-hot-melt-processable component content to no more than 50 wt %, the fibril structure of the porous film 1 can be maintained. The non-fibril-forming and non-hot-melt-processable component is preferably contained at a level of 20-40 wt %, and more preferably contained at a level of 30 wt %. By adopting a content of 20-40 wt %, fibril-formation by the fibril-forming PTFE can be minimized more effectively.

(c) Non-Fibril-Forming and Hot-Melt-Processable Component Having Melting Point of Less than 320° C.

The non-fibril-forming and hot-melt-processable component having a melting point of less than 320° C. (herein also referred to as "non-fibril-forming and hot-melt-processable component") has fluidity when melted, and thereby can melt and solidify in the nodes during manufacture (stretching) of the porous film 1, increasing the strength of the porous film 1 overall, and minimizing deterioration in filter performance, even when the material undergoes compression or the like in subsequent steps. The non-fibril-forming and hot-melt-processable component is preferably one exhibiting a 380° C. melt viscosity of less than 10,000 Pa·s. The melting point of the non-fibril-forming and hot-melt-processable component is the peak top of a heat-of-melting curve obtained by increasing the temperature to or above the melting point at a temperature increase rate of 10° C./min by means of a differential scanning calorimeter (DSC) to bring about initial complete melting, cooling to or below the melting point at 10° C./min, and then again increasing the temperature by 10° C./min.

As the non-fibril-forming and hot-melt-processable component, there may be cited hot-melt-processable fluoropolymers, polystyrene, polyethylene terephthalate (PET), polyester, polyamide, and other such resins or mixtures of these, able to exhibit sufficient melting and fluidity at the stretching temperature during manufacture of the porous film 1. Among these, hot-melt-processable fluoropolymers are preferred from the standpoint of exceptional heat resistance at the stretching temperature during manufacture of the porous film 1, and exceptional chemical resistance. As hot-melt-processable fluoropolymers, there may be cited fluoropolymers that include copolymer units derived from at least one, and preferably two or more, fluorinated ethylenically unsaturated monomers represented by general formula (2) below:

$$RCF=CR_2 \quad (2)$$

(in the formula, R is independently selected from H, F, Cl, C1-8 alkyl, C6-8 aryl, C3-10 cycloalkyl, and C1-8 perfluoroalkyl, in which case all R may be the same, or any two R may be the same with the remaining R different therefrom, or all R may be different).

There are no particular limitations as to useful examples of compounds represented by general formula (2), and there may be cited fluoroethylene, VDF, trifluoroethylene. TFE, HEP, and other perfluoroolefins, CTFE, dichlorodifluoroethylene and other chloroolefins, PFBE, PFHE, and other (perfluoroalkyl)ethylene, perfluoro-1,3-dioxole, and mixtures thereof.

The fluoropolymer may also include a copolymer derived from a copolymer of at least one of the monomers represented by the preceding general formula (2), and at least one polymerizable co-monomer represented by the preceding general formula (1) and/or general formula (3) below:

$$R_2C=CR_2 \quad (3)$$

(in the formula, R is independently selected from H, Cl, C1-8 alkyl, C6-8 aryl, and C3-10 cycloalkyl, in which case all R may be the same, or any two or more R may be the same, with these two or more R and the remaining other R being different, or all R may be different from one another, and in the case that there are a plurality of other R, these may differ from one another as well).

As useful examples of compounds represented by general formula (1), there may be cited PAVE, and preferably PPVE, PMVE, and the like.

As useful examples of compounds represented by general formula (3), there may be cited ethylene, propylene, and the like.

As more specific examples of fluoropolymers, there may be cited polyfluoroethylene derived by polymerization of fluoroethylene, polychlorotrifluoroethylene (PCTFE) derived by polymerization of polyvinylidene fluoride (PVDF) derived by polymerization of VDF, or of CTFE, fluoropolymers derived from copolymers of two or more different monomers represented by the above general formula (2), and fluoropolymers derived from copolymers of at least one monomer represented by the above general formula (2), and at least one monomer represented by the above general formula (1) and/or at least one represented by the above general formula (3).

Examples of such polymers are polymers having copolymer units derived from VDF and HFP, and polymers derived from TFE and at least one copolymerizable co-monomer (at least 3 wt %) besides TFE. As fluoropolymers of the latter type, there may be cited TFE/PAVE copolymers (PFA), TFE/PAVE/CTFE copolymers, TFE/HFP copolymers (FEP), TFE/ethylene copolymers (ETFE), TFE/HFP/ethylene copolymers, (EFEP), TFE/VDF copolymers, TFE/VDF/HFP copolymers, TFE/VDF/CTFE copolymers, and the like, or mixtures of these.

The non-fibril-forming and hot-melt-processable component content of the porous film 1 is preferably at least 0.1 wt %, but less than 20 wt %. By keeping the non-fibril-forming and hot-melt-processable component to less than 20 wt %, situations in which the component diffuses into sections other than the nodes within the porous film 1, causing the pressure loss of the porous film 1 to rise, can be minimized. Moreover, by keeping the content to less than 20 wt %, it is easy to carry out stretching at a high elongation area ratio, namely, a high ratio of 40 or above, as discussed below. By setting the non-fibril-forming and hot-melt-processable component level in the porous film 1 to at least 0.1 wt %, deterioration in filter performance of the porous film due to compressive force or the like in subsequent steps can be minimized to a sufficient extent. The non-fibril-forming and hot-melt-processable component content of the porous film 1 is preferably 15 wt % or less, and more preferably 10 wt % or less. From the standpoint of ensuring the strength of the porous film 1, the non-fibril-forming and hot-melt-processable component of the porous film 1 is preferably at least 0.5 wt %. About 5 wt % is especially preferred.

In order for stretching by an elongation area ratio of 40-800 to proceed smoothly, the non-fibril-forming and hot-melt-processable component content is preferably no more than 10 wt %.

The porous film 1 preferably has a filling rate, calculated according to the expression below, of 1-20%, and more preferably 2-10%

Filling rate (%)={1−(void volume in porous film/volume of porous film)}×100

The porous film 1 having such a filling rate will have a film thickness reduction speed, discussed below, of 1.5 µm/sec or less when subjected to a pressure of 6.4 kPa.

The porous film 1 can be obtained, for example, in accordance with the method for manufacturing an embossed air filter filtration medium described below. The porous film 1 can be fabricated using, for example, the composition, mixed powder, or molding materials mentioned below.

The porous film 1 has thickness of 150 µm or less, and preferably 7-120 µm. The average fibril diameter of the fibrils that make of the porous film 1 is 50-200 nm, for example, and preferably 80-200 nm.

The pressure loss of the porous film 1 is, for example, 190 Pa or lower, and preferably 50-150 Pa.

The PF value of the porous film is, for example, 20 or above, and preferably 25 or above. While there is no particular limitation as to the upper limit value of the PF value, the upper limit may be, e.g., 40, and preferably 35.

There are no particular limitations as to the material or structure of the air-permeable support materials 13; for example, nonwoven fabric, woven fabric, metal mesh, resin netting, or the like may be used. Of these, nonwoven fabric having thermal fusing properties is preferred from the standpoint of strength, trapping ability, flexibility, and operability. The nonwoven fabric is preferably a nonwoven fabric in which all or a portion of the constituent fibers have a core-in-sheath structure; a two-layer nonwoven fabric comprising two layers, i.e., a layer of fibers of a low-melt material and a layer of fibers of a high-melt material; or a nonwoven fabric coated on the surface with a thermal-fusing resin. In nonwoven fabrics of core-in-sheath structure, the core component preferably has a higher melting point than the sheath component. For example, as core-in-sheath material combinations, there may be cited, e.g., PET/PE, or high-melt polyester/low-melt polyester. As low-melt material/high-melt material combinations in two-layer nonwoven fabrics, there may be cited, for example, PE/PET, PP/PET, PBT/PET, and low-melt PET/high-melt PET. As nonwoven fabrics coated on the surface with a thermal-fusing resin, there may be cited, for example, PET nonwoven fabric coated with EVA (ethylene vinyl acetate copolymer resin), or PET nonwoven fabric coated with an olefin resin.

There are no particular limitations as to the material of the nonwoven fabric, and polyolefins (PE, PP, and the like), polyamides, polyesters (PET and the like), aromatic polyamides, composite materials of these, and the like can be used. The air-permeable support materials 13 can be joined to the porous film 1 through partial melting of the air-permeable support materials 13 induced by heat, or by melting of a hot-melt resin, utilizing an anchor effect, or utilizing adhesion by a reactive adhesive or the like.

There are no particular limitations as to the weight or thickness of the air-permeable support materials 13, and these parameters may be the same or differ at either side of the porous film 1.

The filtration medium 10 may include a plurality of the porous films 1. In this case, the plurality of porous films may be laminated directly, or with the air-permeable support materials 13 interposed therebetween.

In order to extend the life of the filtration medium 10, a pre-trap layer, not illustrated, may be further laminated onto the air-permeable support material 13 at one side (normally, the upstream side of the current of air passing through the filtration medium). As the pre-trap layer, there may be employed, e.g., one obtained by a melt-blown process. As materials for the pre-trap layer, there may be cited, for example, besides polyethylene (PE), polypropylene (PP), polyethylene terephthalate (PET), polybutylene terephthalate (PBT), polyamide (PA), polyacrylonitrile (PAN), polyvinylidene fluoride (PVdF), polyvinyl alcohol (PVA), polyurethane (PU), and the like. The pre-trap layer can be joined to the porous film 1 by heat lamination using a hot-melt resin, for example. The filtration medium 10 provided with such a pre-trap layer is preferably employed as a HEPA filter. In this case, the air-permeable support materials 13 employed at either side of the porous film 1 will be different in thickness, but identical in weight. In the case of employing the filtration medium as an ULPA filter, a pre-trap layer of the sort described here is unnecessary. The filtration medium 10 may be one in which a pre-trap layer is laminated directly to the porous film 1, rather than to the air-permeable support materials 13.

The pressure loss of the filtration medium 10 is, e.g., 200 Pa or less, and preferably 60-160 Pa.

The PF value of the filtration medium is, e.g., 18 or above, and preferably 23 or above. While there is no particular limitation as to the upper limit value of the PF value, the upper limit may be, e.g., 40, and preferably 35.

Next, the projections furnished to the filtration medium 10 will be described while making reference to FIGS. 1 and 3.

Figure 3:
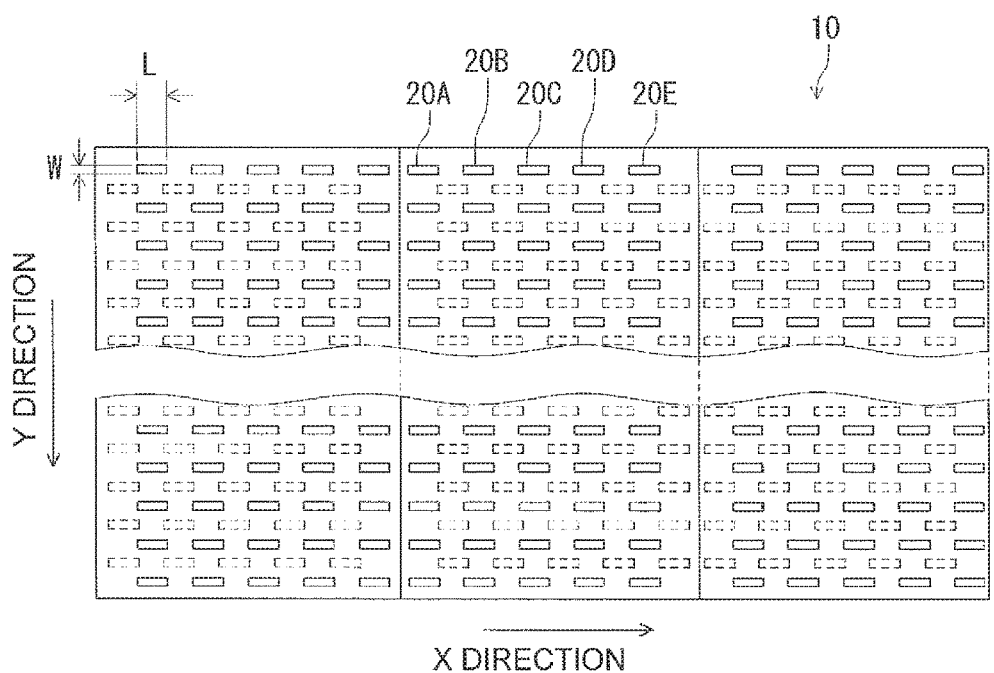
FIG. 3 is a development view of the filtration medium of the present embodiment.

FIG. 3 is a development view of the filtration medium 10. The filtration medium 10 shown in FIGS. 1 and 3 is furnished with dot-shaped projections 20A-20E on the front and back surfaces. The filtration medium 10 is folded such that mountain folds and valley folds appear in alternating fashion, and spacing is retained between pairs of mutually facing surfaces (opposed surfaces) when folded.

The projections 20A-20E are formed on the surfaces at both sides such that spacing can be retained between adjacent surfaces (opposed surfaces) of the filtration medium 10 when folded into mountain folds and valley folds. The dot-shaped projections 20A-20E can be formed to various three-dimensional shapes. Herein, projections protruding out towards the near side from one surface of the filtration medium 10 are called convex projections, and embossed protrusions protruding out towards the other side are called concave projections. Specifically, the concave projections seen from one surface of the filtration medium 10 are convex projections when seen from the other surface.

The width W (width in the Y direction) and length L (length in the X direction) of the projections 20A-20E are defined as shown in FIG. 3, in relation to the contour shapes of the edges of the uplifted sections of the convex projections, with the convex projections of the projections 20A-20E viewed from perpendicularly above with respect to the surface of the filtration medium 10. When the highest sections of the convex projections contact a hypothetical plane parallel to the flat surface of the filtration medium 10, the spacing between the hypothetical plane and the surface of the filtration medium 10 is defined as the protrusion height H of the projections 20A-20E, and flat surfaces that include these points of contact with the hypothetical plane are defined as apical surfaces.

The protruding shapes of the projections 20A-20E may be selected from cuboid, regular hexahedral, prismatic columns, circular columns, semi-spherical, spherical zone, frusto-pyramidal, conical, pyramidal, truncated conical, and various other shapes. The protruding shapes of the projections 20A-20E on facing surfaces of the filtration medium 10 need not be symmetrical. For example, the individual apical surfaces of the projections 20A-20E may have convex portions and concave portions further formed thereon, such that the convex portions and concave portions of the projections 20A-20E catch against one another when the projections 20A-20E on facing surfaces of the filtration medium 10 come into contact against one another. Because the projections 20A-20E catch one another by the convex portions and the concave portions, position shifting of the contacting projections 20A-20E is unlikely to occur. In so doing, the zigzag configuration of the filtration medium 10 can be securely retained. The apical surfaces of the projections 20A-20E may be flat surfaces of flat rectangular shape such as oblong and/or square, or curved surfaces having curvature, such as semispherical and/or circular column shaped.

A plurality of the projections 20A-20E are arrayed in the X direction (see FIG. 3), which is the direction of advance from an apical portion of a mountain fold to the valley bottom portion of a valley fold of the filtration medium 10, with the individual protrusion heights thereof becoming progressively lower advancing from an apical portion of a mountain fold to the valley bottom portion of a valley fold, whereby the shapes of the concave portions can be maintained in a "V" shape or "U" shape such that pressure loss in the air filter unit can be lowered. Specifically, the locations of maximum protrusion of the projections 20A-20E are locations closest to apical portions of the mountain folds, and the locations of minimum protrusion of the projections 20A-20E are locations closest to valley bottom portions of the valley folds.

Of the protrusion heights H of the projections 20A-20E, the maximum protrusion height, not including the thickness of the filtration medium 10, is preferably 2-6 mm. Advancing in the X direction from this maximum protrusion height, the protrusion heights H of the projections 20A-20E become lower. Where the protrusion height H at the maximum protrusion height location among the protrusion heights H is greater than 6 mm, the spacing between apical portions of adjacent mountain folds of the filtration medium 10 become wider, the dust trapping efficiency becomes lower, and the filtration medium 10 employing the porous film, discussed later, experiences localized stretching out due to the embossing process, leading to a risk of rupture of the filtration medium 10. The protrusion height H at the minimum protrusion height locations among the protrusion heights H is defined by a range such that the facing surfaces of the filtration medium 10 do not come into contact with one another, making it possible to retain spaces within the filtration medium 10.

The projections 20A-20E are arrayed in multiple rows in the Y direction (see FIG. 3) orthogonal to the direction of advance from apical portions of the mountain folds to valley bottom portions of the valley folds of the filtration medium 10. As each row of projections has constant height, the filtration medium 10 can be maintained in a constant shape.

The width W of the projections 20A-20E is preferably 1.0-10 mm, and more preferably 2.0-9.0 mm. Where the width W is greater than 10 mm, structural resistance to the stream of air increases, with a risk of increased pressure loss in the air filter unit. Where the width W is smaller than 1.0 mm, the projections 20A-20E may shift out of position when the filtration medium 10 is folded into mountain folds and valley folds, so that the zigzag configuration of the filtration medium 10 cannot be retained, leading in some cases to increased pressure loss in the air filter unit 11.

The length L of the projections is preferably 1.0 mm-20 mm, and more preferably 3.0 mm-18 mm. Where the length L is greater than 20 mm, the effective filtration area of the filtration medium 10 is reduced, posing a risk of increased pressure loss. Where the length L is shorter than 1.0 mm, the projections 20A-20E may shift out of position when the filtration medium 10 is folded into alternating mountain folds and valley folds, so that the zigzag configuration of the filtration medium 10 cannot be retained, leading in some cases to increased pressure loss in the air filter unit 11.

The ratio of width W and length L (length/width), i.e., the aspect ratio, of the shapes of the projections 20A-20E is preferably 0.5-3, and more preferably 1-2. Where the aspect ratio is less than 0.5, the projections 20A-20E furnished to facing surfaces of the filtration medium 10 may shift out of place during folding of the filtration medium 10 into alternating mountain folds and valley folds, so that in some instances shape cannot be retained. Where the aspect ratio is greater than 3, reduction in the effective filtration area of the filtration medium 10 may cause an increase in pressure loss in some instances.

In preferred practice, the width W and length L of the projections 20A-20E arrayed in a plurality of rows in the Y direction of the filtration medium 10 (see FIG. 3) will increase in continuous or stepwise fashion, advancing from valley bottom portions of the valley folds to apical portions of the mountain folds. The reason is that, in cases in which the projections 20A-20E are formed so as to be tall in height, in cases in which the projections 20A-20E are short in width W and height L, they are subjected to great force per unit surface area of the filtration medium 10 during the embossing process, and in some instances the filtration medium 10 may rupture. Rupture of the filtration medium 10 can be prevented by adopting greater width W and length L in the projections 20A-20E having tall protrusion height H.

For the projections 20A-20E, the rising angle is defined as the angle formed in relation to the flat surface of the filtration medium 10, by a straight line that connects a point nearest the apical portion of a mountain fold along the contour line of the rising edge of the projection 20A-20E from the flat surface of the filtration medium 10, and the highest point on the embossed projection 20A-20E. In cases in which the apical surfaces of the projections 20A-20E are flat surfaces, the highest point would be the point closest to the apical portion of the mountain fold, on the apical surface.

The appropriate rising angles of the projections 20A-20E are different angles, depending on the protruding height H. In cases in which, for example, the protruding heights H of the projections 20A-20E are 2.0 mm or greater, the rising angle is preferably 30 degrees to 90 degrees, and more preferably 30 degrees to 60 degrees. Where the rising angles exceed 90 degrees, the deformation load on the filtration medium 10 is excessively large, and where the rising angles are less than 30 degrees, the surface area of the apical surfaces of the projections 20A-20E will be small. In cases in which the protruding heights H of the projections 20A-20E are less than 2.0 mm, the rising angle is preferably 90 degrees or less, and more preferably 60 degrees or less.

The projections 20A-20E included in the rows extending in the X direction and Y direction in FIG. 3 preferably number at least 2 but no more than 15, and more preferably at least 3 but no more than 10. Where the aforementioned number of the projections 20A-20E is less than 2, it is difficult for spacing to be retained between the apical portions of the mountain folds, and in some instances the projections 20A-20E within the stream sections may come into contact against a facing surface of the filtration medium 10 in sections other than those where the projections 20A-20E are disposed, leading to increased pressure loss. On the other hand, where the aforementioned number of the projections 20A-20E is greater than 16, the effective filtration area through which the stream of air passes is small, leading to increased pressure loss.

The spacing between the projections 20A-20E in the X direction are preferably 5 mm-25 mm, and more preferably 7 mm-20 mm. Where the spacing is less than 5 mm, there are instances in which the projections 20A-20E of the folded filtration medium 10 shift out of position so that shape cannot be retained. Where the spacing is greater than 25 mm, there are instances in which the filtration medium 10 becomes distended in the stream of air, and comes into contact with an adjacent surface of the filtration medium 10, leading to increased pressure loss in the air filter unit 11.

The spacing among the projections 20A-20E in the Y direction is preferably 15 mm-60 mm. The concave projections 20A-20E are disposed between the convex projections 20A-20E and the neighboring convex projections 20A-20E; in preferred practice, a row of the concave projections 20A-20E is formed between two neighboring rows of the convex projections 20A-20E. When the convex projections 20A-20E and the concave projections 20A-20E are arranged eccentrically, there may be instances in which the flow of air in the air filter unit 11 is uneven, and pressure loss in the air filter unit 11 increases.

The proportion of the surface area occupied by the projections 20A-20E formed on the filtration medium 10 is preferably less than 20% of the surface area of the filtration medium 10 surface. Where the proportion is 20% or greater, the effective filtration area of the filtration medium 10 is smaller, resulting in a tendency for pressure loss to increase and dust trapping efficiency to decrease. The form of the projections 20A-20E is not limited to those described above, and various forms can be adopted. For example, it would be acceptable for some of the projections among the plurality of projections to contact other facing projections and function as spacers, while the remaining projections among the plurality of projections do not contact other projections. Alternatively, a configuration in which pairs of mutually facing projections come into contact in some areas, while in other areas separate spacer members are arranged between the pairs of protrusions to form spaces, or a configuration in which pairs mutually facing projections do not contact, and the spacers are arranged in spaces between the pairs of projections, would also be acceptable. Further, a configuration in which, for example, mutually facing projections are formed to a shape comprising part of a spherical surface so as to come into point contact would also be acceptable.

As the form of the projections, there can be adopted, for example, the form of the projections 20A-20E disclosed in Japanese Laid-open Patent Application No. 2013-52321, the form of the dot-shaped projections disclosed in International Patent Application No. 2010/073451, the form of the first and second protruding portions disclosed in International Patent Application No. 2012/002187, the form of the recessed portions and/or raised portions disclosed in Japanese Translation of PCT International Application Publication No 9-507156, the form of the concave spacers 5 and convex spacers 6 disclosed in Japanese Utility Model Application No. 3-19507, the form of discontinuous lines 33 shown in Japanese Laid-open Patent Application No. 2011-25238, and the like.

The projections are formed by an embossing process, described below.

The porous film 1 employed in the filtration medium 10 is composed mainly of fibril-forming PTFE, whereby a porous film having high air permeability at a low filling rate can be obtained. By employing this type of porous film 1, not only is a filtration medium having low pressure loss obtained, but due to the improved strength of the porous film 1 as mentioned above, the filtration life is markedly improved, and a lifespan on part with that of a glass fiber filter is achieved. Here, a low filling rate refers to a filling rate of 1-20%, as calculated by the expression given above. High air permeability refers to low pressure loss. Low pressure loss refers to pressure loss of less than 200 Pa, measured by the method described below. Filtration life is measured by the method described below.

The filtration medium 10 may be employed in applications such as the following, for example.

Fields such as ULPA filters (for semiconductor manufacture), HEPA filters (for hospitals, semiconductor manufacture), cylindrical cartridge filters (for industrial use), bag filters (for industrial use), heat-resistant bag filters (for exhaust gas treatment), heat-resistant pleated filters (for exhaust gas treatment), SINBRAN™ filters (for industrial use), catalytic filters (for exhaust gas treatment), filters containing adsorbents (for assembly in hard disk drives (HDD), vent filters containing adsorbents (for assembly in HDDs), vent filters (for assembly in HDDs and the like), vacuum cleaner filters (for vacuum cleaners), general purpose multilayer felt materials, gas turbine (GT) cartridge filters (GT compatible parts), cleaning filters (for use in electronic device housings), and the like;

ventilation/internal pressure regulation fields, such as materials for freeze drying use in containers for freeze drying use, automotive ventilation materials for electronic circuits and/or lamps, container applications such as container caps, protective ventilation applications for electronic equipment, and medical ventilation applications; and liquid filtration fields such as semiconductor liquid filtration filters (for semiconductor manufacture), hydrophilic filters (for semiconductor manufacture), filters for chemical products (chemical solution treatment), filters for purified water manufacturing lines (purified water manufacture), backwashing liquid filtration filters (for industrial effluent treatment), and the like.

The aforedescribed filtration medium 10, due to the inclusion of the non-fibril-forming and hot-melt-processable component (component C) in the porous film, has hard nodes, improving the strength of the porous film. For this reason, even in the event that the filtration medium 10 is compressed under pressure by the embossing process, crushing of the film structure of the porous film 1 is limited, whereby rise in pressure loss can be limited, as well as minimizing decline in localized trapping efficiency and the occurrence of leak defects.

When compressed under pressure during the embossing process, a conventional PTFE porous film will experience a reduction in thickness and crushing of the film structure, and therefore have substantially no recovery (no return) to the original thickness, even when released after being compressed under pressure. The reduction in thickness of the porous film can result in an increase in the filling rate of the porous film, as a result of which pressure loss rises. It is known that the flow velocity U of air within a filtration medium can usually be represented by the following general formula by using the filling rate a of the porous film, where Q denotes the flow rate of air passing through the filtration medium and A the surface area of the filtration medium. An increase in the filling rate a leads to an increase in the flow velocity U.

$$U = Q/A(1-\alpha)$$

The reason is that the volume of sections through which air passes in a filtration medium is smaller than the volume of the porous film by the equivalent of the volume of the fibrils constituting the porous film, and therefore when the filling rate a increases, the volume of the sections through which air passes decreases, and as a result, where the flow rate Q of air is constant, the flow velocity U increases. Because the pressure loss of a filtration medium is represented as the sum of resistance force to a stream of air by the fibrils that make up the filtration medium, when the resistance force increases in association with rising flow velocity U, the pressure loss of the filtration medium rises. That is, when the filling rate a increases, the pressure loss of the filtration medium increases.

With regard to trapping of particles by a fibril layer such as a porous film, in the case of trapping of particles in a liquid, trapping occurs through a "sieve" effect, whereas in the case of trapping of particles in a gas, trapping occurs as particles moving through the fibril layer interior collide with and are deposited onto fibril surfaces. Consequently, reduction in thickness of the fibril layer as described above leads to a decrease in the frequency of collisions of the fibril surfaces and the particles, or stated another way, to reduced residence time of particles within the fibril layer, thereby leading to a possible decline in trapping efficiency. In case in which the thickness of a PTFE porous film is reduced to an extreme extent of, for example, 1 μm or less, perforating flow passages that perforate through the porous film in the thickness direction form within the film, and particles, particularly those smaller in size than the pore diameter of the PTFE porous film, e.g., particles 0.3 μm or smaller in size, leak out to the downstream side without being trapped by the PTFE porous film, producing leak defects in the air filter unit.

With the filtration medium 10 of the present embodiment, however, due to the improved strength of the porous film described above, the decrease in film thickness due to the embossing process is limited, and as a result, the rise in pressure loss can be minimized, and decline in localized trapping efficiency and the occurrence of leak defects can be minimized.

Moreover, PTFE porous films typically have a film structure in which the fibril diameter is within a range of nano size to sub-micron size (several to several hundred nm), and which has fibrils, and nodes which are formation points of the fibrils. The thickness of the porous film is proportional to the size of the nodes maintaining the film structure of the porous film. With the filtration medium 10 of the present embodiment, the non-hot-melt-processable component, (component B) is added to the starting material of the porous film, and this component B is included within the nodes, whereby the formation of fibrils is minimized, the nodes are enlarged, and as a result the film thickness increases. By regulating the formation of fibrils in this way to increase the thickness of the porous film, appropriate voids are formed in the porous film, and clogging by dust during dust trapping can be prevented.

However, in porous film that employs PTFE as component B, due to the low mechanical strength of PTFE, nodes which, being constituted by component A and component B, are composed of PTFE only, cannot withstand the compressing pressure experience during the embossing process and become flattened out, and the film thickness decreases. With the filtration medium 10 of the present embodiment, however, by further adding the hot-melt-processable component (component C) to the starting material of the porous film, the interior and surfaces of the nodes are strengthened by the component, and the mechanical strength of the nodes increases. Deformation of the nodes due to the embossing process is minimized thereby, the rise in pressure loss is limited, and decline in localized trapping efficiency and the occurrence of leak defects can be minimized.

(Filter Pack)

Next, a filter pack will be described.

Figure 5:
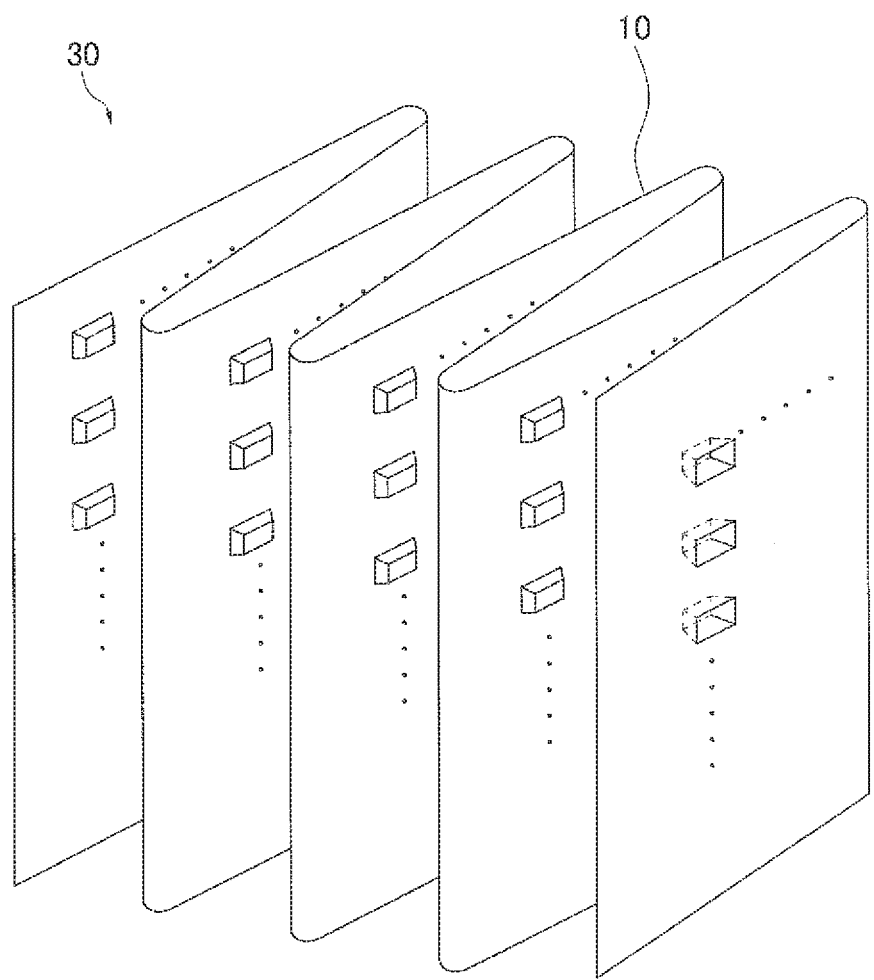
FIG. 5 is an exterior perspective view of a filter pack of the present embodiment.

A filter pack 30 of the present embodiment is shown in FIG. 5.

The filter pack 30 is a processed filtration medium produced by a pleating process of the filtration medium 10. Specifically, the filter pack 30 is of zigzag configuration produced by subjecting the filtration medium 10 to a pleating process involving folding into alternating mountain folds and valley folds. The pleating process can be carried out, for example, by a rotary folding machine.

There are no particular limitations as to the fold width of the filtration medium 10, which is 25-280 mm, for example.

Figure 4:
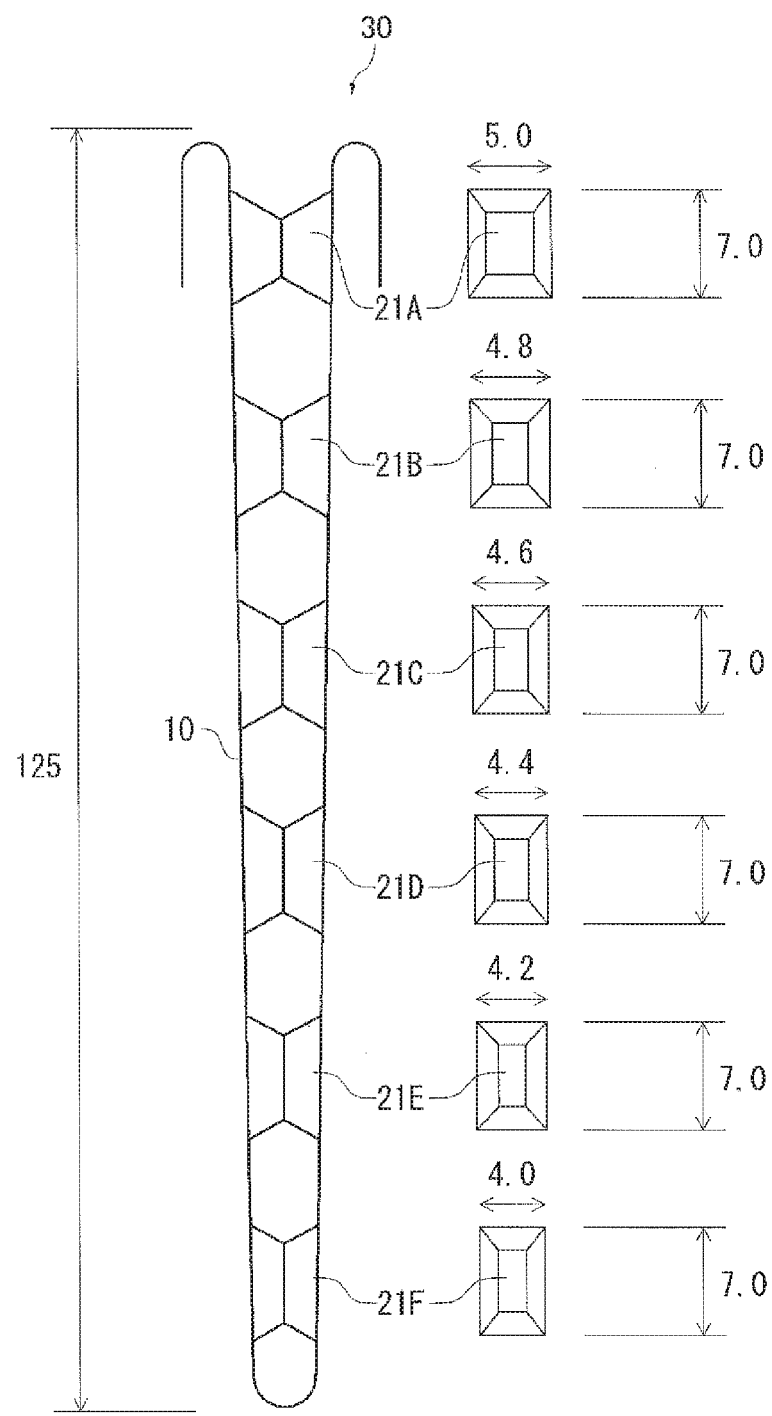
FIG. 4 is a diagram describing protrusions of the filtration medium of the present embodiment.

As shown in FIG. 4, the projections formed by the embossing process of the filtration medium 10 have a plurality of projection pairs 21A-21F facing one another, each formed by two opposed surfaces 10a, 10b placed in opposition by a mounting fold or a valley fold. FIG. 4 is a side view showing the filter pack 30, focusing on a single valley-folded section. In the filter pack 30 shown in FIG. 4, in each of the protrusion pairs 21A-21F, the projections respectively formed on the opposed surfaces 10a, 10b abut one another to maintain the pleat spacing. In FIG. 4, except for symbols 10 and 21A-21F, the numbers accompanied by bidirectional arrows show exemplary dimensions (mm) in the directions indicated by the arrows, although there is no limitation to the dimensions of the projections in the present embodiment.

The form of the projection pairs of the filtration medium 10 is not limited to that shown in FIG. 4, and various forms can be adopted, for example, those shown in FIG. 3 (a)-(h) and FIG. 4 of International Patent Application No. 2010/073451 would be acceptable.

The filter pack can be further provided with spacers for maintaining spacing between sets of two mutually facing projections, the spacers being provided separately from the plurality of projections produced by the embossing process. The spacers are members arranged between two projections forming a pair, and have the function of maintaining pleat spacing that is greater than the sum of the heights of the two projections constituting a projection pair. There are no particular limitations as to the material of the spacers, but it is preferable to employ a resin. The spacers may be two members furnished to the respective projections of the pair of two projections constituting a pair, or a single member disposed between the pair of the two. Resins would include attached adhesives having been applied onto the projections.

As the spacers, there can be adopted, for example, the rigid spacer holders disclosed in Japanese Translation of PCT International Application Publication No. 9-507156, or the like.

(Air Filter Unit)

Next, an air filter unit will be described, while referring to FIG. 6.

Figure 6:
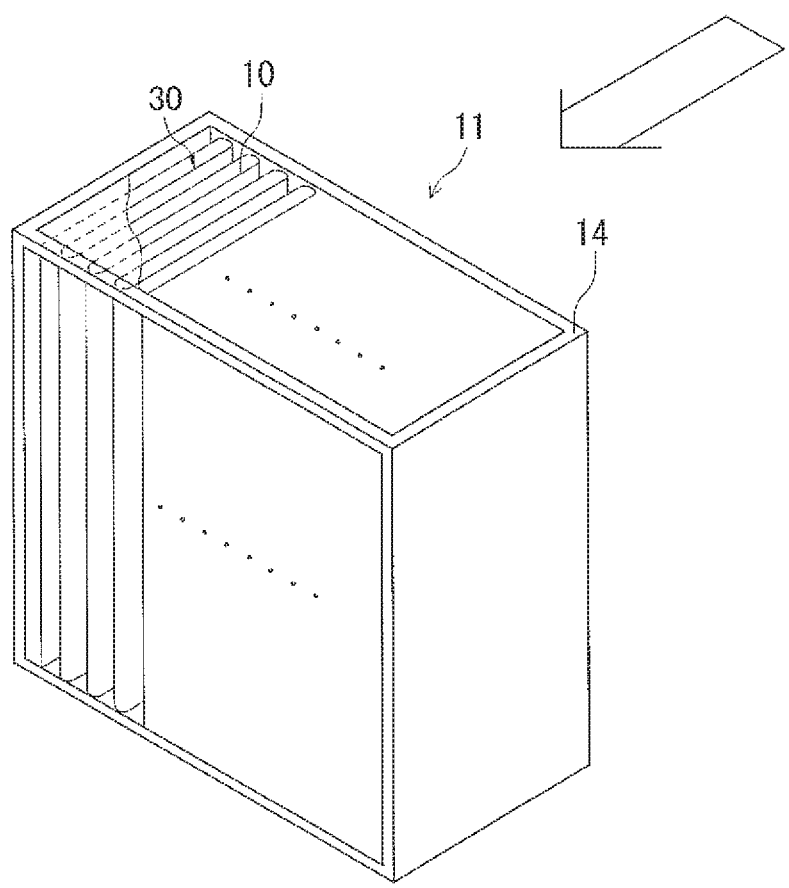
FIG. 6 is an exterior perspective view of an air filter unit of the present embodiment.

FIG. 6 is an exterior perspective view showing an air filter unit 11. The air filter unit 20 is provided with the aforedescribed filter pack 30, and a frame 14, and is characterized in that the filter pack 30 is sealed into the frame 14 by a sealant. The frame 14 is made by assembling panels together, and houses the filter pack 30 in the interior, the filter pack 30 and the frame 14 being sealed together by the sealant. As the sealant, which is intended to prevent leaks between the filter pack 30 and the frame 14, there may be cited ones made, for example, of epoxy, acrylic, urethane, or other resins.

(Method for Manufacturing Filtration Medium for Embossed Air Filter)

The method for manufacturing the filtration medium of the present embodiment is a method for manufacturing the filtration medium for trapping microparticles in a stream of air, and involves carrying out the following steps (a) to (c).

(a) Forming a porous film, employing a fibril-formable polytetrafluoroethylene (component A), a non-fibril-forming and non-hot-melt-processable component (component B), and a non-fibril-forming and hot-melt-processable component having a melting point below 320° C. (component C).

(b) Laminating air-permeable support materials to both sides of the porous film to fabricate an air filter filtration medium, the surfaces at both sides of the air filter filtration medium being formed by the air-permeable support materials.

(c) Subjecting the air filter filtration medium to an embossing process to form a plurality of projections.

A composition, a powder mixture, and a molding material which serve as a starting material for the porous film will be described here.

The composition, powder mixture, and molding material each include the aforedescribed component A, component B, and component C, the component C being contained at a level of 0.1 to less than 20 wt % of the total. The component A, component B, and component C are respectively the same as the fibril-forming PTFE, the non-fibril-forming and non-hot-melt-processable component, and the non-fibril-forming and hot-melt-processable component discussed previously in relation to the porous film 1.

The molding material is, for example, a material for molding a porous film, intended for molding of a porous film to be employed as a filtration medium for a filter used to trap microparticles in a stream of air.

Step (a) is described in detail here.

The form of the starting materials for the porous film may be a powder mixture as described below; a non-powder mixture; or a molding material or composition as discussed below. As powder mixtures, there may be cited, for example, a fine powder obtained through co-coagulation as employed in the examples discussed below, and/or a powder obtained by mixing of two of the three starting materials by co-coagulation, and employing a mixer to mix in the one additional component, or a powder obtained by mixing of the three starting materials with a mixer. As non-powder mixtures, there may be cited, for example, a molded article such as a porous body (e.g., a porous film), or an aqueous dispersion that includes the three components.

A molding material refers to one that has undergone adjustment for the purpose of processing, in order to mold a composition, and could be, for example, a material to which a processing aid (a liquid lubricant or the like) or the like has been added, one having undergone adjustment of the particle size, or one having undergone preliminary molding. The molding material may include, for example, known additives and the like, in addition to the aforedescribed three components. As known additives, there may be cited, for example, carbon nanotubes, carbon black, and other such carbon materials, pigments, photocatalysts, activated carbon, antimicrobial agents, adsorbents, deodorizers, and the like.

The compositions can be manufactured by various methods; for example, in cases in which the composition is a powder mixture, manufacture may take place by a method of mixing a powder of the component A, a powder of the component B, and a powder of the component C, with an ordinary mixer or the like; a method of co-coagulation of three aqueous dispersions respectively including the component A, component B, and component (C) (the aforedescribed step (a)) to obtain a co-coagulated powder; a method of preliminary co-coagulation of aqueous dispersions including any two of the component A, component B, and component C to obtain a mixed powder, which is mixed with a powder of the remaining one component in an ordinary mixer, or the like. With these methods, suitable stretched materials can be obtained regardless of the manufacturing process. Among these, from the standpoint of ease of uniform dispersion of the three different components, a composition obtained through co-coagulation of three aqueous dispersions respectively including the component A, component B, and component (C) is preferred.

There are no particular limitations as to the size of the powder mixture obtained through co-coagulation, and average particle size is, for example, 100-1,000 μm, and preferably 300-800 μm. In this case, average particle size is measured in accordance with JIS K6891. There are no particular limitations as to the apparent density of the powder mixture obtained through co-coagulation, which is, for example, 0.40-0.60 g/ml, and preferably 0.45-0.55 g/ml. The apparent density is measured in accordance with JIS K6892.

Molded articles molded using the composition, mixed powder, or molding material starting material for the porous film are preferably employed in the aforedescribed various filter fields, ventilation/internal pressure regulation fields, and liquid filtration fields, and may also be employed in fields such as the following, for example.

Dielectric material prepregs, electromagnetic interference (EMI) shielding materials, heat-conducting materials, and the like, and more specifically, printed wiring boards, electromagnetic shielding materials, insulating heat-conducting materials, insulating materials, reinforcing materials for conductive polymer films employed in electrolysis devices for table salt and the like and/or in cells, or other such electrochemical fields;

gaskets, packings, pump diaphragms, pump tubes, aircraft sealing materials, or other such air filtration sealing material fields;

apparel (consumer apparel), cable guides (movable wires for bikes), bike apparel (consumer apparel), cast liners (medical supporter), vacuum cleaner filters, bagpipes (musical instruments), cables (signal cables for guitars the like), strings (for stringed instruments), or other such ordinary consumable fields;

fibers (fiber materials), machine sewing thread (textiles), weaving yarn (textiles), ropes, or other such fiber fields; and bodily implants (stretched products), artificial blood vessels, catheters, general surgical (tissue reinforcing materials), craniocervical products (dura matter replacement), oral health (tissue reconstruction treatment), orthopedic surgery (surgical dressings), or other such medical fields.

As the aforedescribed co-coagulation methods, there may be cited, for example, (i) mixing an aqueous dispersion of component (A), an aqueous dispersion of component (B), and an aqueous dispersion of component (C), followed by coagulation;

(ii) adding, to an aqueous dispersion of any one component among component (A), component (B), and component (C), powders of the remaining two components, followed by coagulation;

(iii) adding a powder of any one component among component (A), component (B), and component (C), to a mixed aqueous dispersion obtained by mixing aqueous dispersions of the remaining two components, followed by coagulation; and (iv) pre-mixing aqueous dispersions of any two components among component (A), component (B), and component (C), followed by coagulation to obtain a mixed powder to the two components, which is added to an aqueous dispersion of the remaining one component, followed by coagulation.

From the standpoint of ease of uniform dispersion of the three components, the aforedescribed method of (i) is preferred as the aforedescribed co-coagulation method.

During co-coagulation by the aforedescribed methods of (i)-(iv), it is preferable for coagulation to be brought about by adding, for example, any of nitric acid, hydrochloric acid, sulfuric acid, or other acids; magnesium chloride, calcium chloride, sodium chloride, aluminum sulfate, magnesium sulfate, barium sulfate, sodium bicarbonate, sodium carbonate, or other metal salts; or acetone, methanol, or other organic solvents.

There are no particular limitations as to the form of the component (A) prior to mixing, and an aqueous dispersion or powder of the aforementioned fibril-forming PTFE would be acceptable. As powders (in particular, the fine powders mentioned above), there may be cited the Mitsui-Dupont Fluorochemicals products TEFLON 6-J (TEFLON is a registered trademark), TEFLON 6C-J, TEFLON 62-J, and the like; the Daikin Industries products POLYFLON F106, POLYFLON F104, POLYFLON F201, POLYFLON F302, and the like; the Asahi Glass products FLUON CD123, FLUON CD1, FLUON CD141, FLUON CD145, and the like, or the Dupont products TEFLON 60, TEFLON 60 X, TEFLON 601A, TEFLON 601 X, TEFLON 613A, TEFLON 613A X, TEFLON 605XT X, TEFLON 669 X, and the like. The fine powders may be obtained by coagulation and drying of PTFE aqueous dispersion (freshly-polymerized aqueous dispersion) obtained by emulsion polymerization of TFE.

The aqueous dispersion of fibril-forming PTFE may be a freshly-polymerized aqueous dispersion as described above, or a commercially available aqueous dispersion. As a preferred method for preparation of a freshly-polymerized, fibril-forming PTFE aqueous dispersion, there may be cited the preparation methods disclosed in the aforementioned patent publications cited as examples disclosing homo-PTFE. As commercially available aqueous dispersions of fibril-forming PTFE, there may be cited aqueous dispersions of the Daikin Industries products POLYFLON D-110, POLYFLON D-210, POLYFLON D-210C, POLYFLON D-310, and the like; the Mitsui-Dupont Fluorochemicals products TEFLON 31-JR, TEFLON 34-JR, and the like; and the Asahi Glass products FLUON AD911L, FLUON AD912L, AD938L, and the like. In any of the commercially available aqueous dispersions of fibril-forming PTFE, non-ionic surfactants or the like are added at levels of 2-10 weight parts per 100 weight parts of PTFE in the aqueous dispersion in order to maintain stability, and therefore the nonionic surfactants tend to remain in the mixed powder obtained by co-coagulation, posing a risk of problems such as discoloration of the porous body. For this reason, a freshly-polymerized aqueous dispersion is preferred as the aqueous dispersion of fibril-forming PTFE.

There are no particular limitations as to the form of the component (B) prior to mixing; and in cases where component B is a low-molecular weight PTFE, while there are no particular limitations as to the form prior to mixing, an aqueous dispersion would be acceptable, as would a powder (typically called a "PTFE micropowder" or "micropowder"). As low-molecular weight PTFE powders, there may be cited, for example, the Mitsui-Dupont Fluorochemicals product MP1300-J or the like; the Daikin Industries products LUBRON L-5, LUBRON L-5F, and the like; the Asahi Glass products FLUON L169J, FLUON L170J, FLUON L172J, and the like; and the Kitamura products KTL-F, TLF-500F, and the like.

The aqueous dispersion of low-molecular weight PTFE may be a freshly-polymerized aqueous dispersion obtained by emulsion polymerization of TFE as described above, or a commercially available aqueous dispersion. A micropowder dispersed in water using a surfactant or the like can also be used. As preferred methods for preparation of a freshly-polymerized, fibril-forming PTFE aqueous dispersion, there may be cited the preparation methods disclosed in Japanese Laid-open Patent Application No. 7-165828, Japanese Laid-open Patent Application No. 10-147617, Japanese Laid-open Patent Application No. 2006-063140, Japanese Laid-open Patent Application No. 2009-1745, International Patent Application No. 2009/020187, and the like. As commercially available aqueous dispersions of fibril-forming PTFE, there may be cited aqueous dispersions of the Daikin Industries product LUBRON LDW-410 and the like. In any of the commercially available low-molecular weight PTFE aqueous dispersions, nonionic surfactants or the like are added at levels of 2-10 weight parts per 100 weight parts of PTFE in the aqueous dispersion in order to maintain stability, and therefore the nonionic surfactants tend to remain in the mixed powder obtained by co-coagulation, posing a risk of problems such as discoloration of the porous body. For this reason, a freshly-polymerized aqueous dispersion is preferred as the aqueous dispersion of low-molecular weight PTFE.

In cases where an inorganic filler is employed as the component B, there are likewise no limitations as to the form thereof prior to mixing; however, an aqueous dispersion is preferred. As inorganic fillers, there may be cited TALC P2 made by Nippon Talc, LMR-100 made by Fuji Talc Industrial Co., and the like. These may undergo surface treatment with an appropriate silane coupling agent or the like, and the powder dispersed in water for use. Among these, a secondary-milled product (TALC P2 or the like) produced by a jet mill is preferred, for reasons having to do with dispersibility in water.

As the component C, besides fluororesins such as FEP and PFA, various resins such acrylic, urethane, or PET resins for example, may be cited. While there are no limitations as to the form thereof prior to mixing, an aqueous dispersion is preferred. In the case of a resin obtained by emulsion polymerization, the freshly-polymerized dispersion may be used without further modification as the aqueous dispersion, though a resin powder may be dispersed into the aqueous component using a surfactant or the like. The aqueous dispersion is prepared by dispersing a prescribed amount of component C into water, such that the content thereof in the porous film is 0.1 to less than 20 wt %.

There are no limitations as to the method for co-coagulation, but in preferred practice, three aqueous dispersions are mixed, then subjected to mechanical stirring force.

Co-coagulation is followed by dewatering and drying, an extrusion aid (liquid lubricant) is mixed in, and extrusion is carried out. There are no limitations as to the liquid lubricant, which may be any substance capable of wetting the surfaces of the PTFE powder, and of being eliminated after the mixture obtained through co-coagulation has been molded into a film profile. For example, liquid paraffin, naphtha, white oil, toluene, xylene, or other hydrocarbon oils, alcohols, ketones, esters, and the like may be cited.

The amount in which the liquid lubricant is used will differ depending on factors such as the type of liquid lubricant, but is ordinarily 5-50 weight parts to 100 weight parts of PTFE powder. Pressure loss can be lessened by increasing the amount of liquid lubricant used.

A film profile is molded by mixing a liquid lubricant into the mixture obtained through co-coagulation, then extruding and rolling the material by conventional known methods. Extrusion may be carried out by paste extrusion, ram extrusion, or the like, and preferably carried out by paste extrusion. The extruded sheet profile extruded by paste extrusion is rolled under heating, e.g., under temperature conditions of 40-80° C., using a calender roll or the like. The thickness of the rolled film profile obtained thereby is set on the basis of the target thickness of the porous film, but is ordinarily 100-400 μm.

Next, the liquid lubricant is eliminated from the rolled, unbaked film. Elimination of the liquid lubricant may be carried out by a heating process or extraction process, or a combination of these. In the case of a heating process, there are no particular limitations as to the heating temperature, provided it is lower than the melting point of the non-fibril-forming and hot-melt-processable component, e.g., 100-250° C.

The rolled material from which the liquid lubricant has been eliminated is stretched at a temperature at or above the melting point of the non-fibril-forming and hot-melt-processable component, and no higher than the decomposition temperature of the non-fibril-forming and non-hot-melt-processable component. In the process, the non-fibril-forming and hot-melt-processable component melts, and subsequently solidifies in the nodes, thereby reinforcing the strength of the porous film 1 in the thickness direction. The stretching temperature at this time may be set by the temperature of the furnace where stretching is carried out, or by the temperature of heated rollers that convey the rolled material, or through a combination of these settings.

Stretching includes stretching in a first direction, and preferably also stretching in a second direction orthogonal to the first direction. In cases in which the porous film 1 will be employed as an embossed air filter filtration medium, it is preferable for stretching to be conducted in a second direction as well. In the present embodiment, the first direction is the lengthwise direction (longitudinal direction) of the rolled material, and the second direction is the width direction (traverse direction) of the rolled material.

The rolled material is stretched at an elongation area ratio of 40-800. The stretching rate in the first direction is preferably 10-600%/sec, and more preferably 10-150%/sec. The temperature during stretching is preferably 200-350° C., and more preferably 280-310° C.

The stretching rate in the second direction is preferably 10-600%/sec. The temperature during stretching is preferably 200-400° C., and more preferably 250-350° C. Stretching in the second direction may be conducted simultaneously with stretching in the first direction, or separately.

In relation to stretching of the rolled material (also referred to as an "unbaked fluororesin material"), it is known that the temperature during stretching, the stretching ratio, and the stretching rate influence the physical properties of the stretched material. The S-S curve (graph showing the relationship of elongation and tensile force in tension) of the unbaked fluororesin material shows unique characteristics that are different from other resins. Normally, a resin material experiences a rise in tensile force in tension in association with elongation. Parameters such as the range of the elastic area, the rupture point, and the like differ depending on the material and the evaluation conditions, but it is exceedingly common for the tensile force in tension to exhibit a tendency to rise in association with the amount of elongation. In contrast to this, with an unbaked fluororesin material, the tensile force in tension, after reaching a peak at a given amount of elongation, exhibits a tendency of gradual decrease. This fact indicates that there is an "area in which the unstretched region is weaker than the stretched region" in the unbaked fluororesin material.

To translate this fact into behavior during stretching, in the case of an ordinary resin, during stretching, the weakest section within the stretching plane begins to stretch, and as the stretched section becomes stronger than the unstretched section, the next-weakest unstretched section is stretched, and the stretched area expands, leading to stretching overall. In the case of an unbaked fluororesin material, on the other hand, when a section beginning to elongate reaches the aforementioned "area in which the unstretched region is weaker than the stretched region," the previously elongated section is stretched further, as a result of which the unstretched section remains in the form of a node (unstretched portion). This phenomenon is more pronounced at slower stretching rates, and larger nodes (unstretched portions) remain. This phenomenon may be utilized during stretching to make adjustments to the physical properties of the stretched material, for various applications.

In the present embodiment, it is preferable to obtain a stretched material of lower density, and to do so it is effective to apply a low stretching rate, particularly during first stretching. In order to obtain a molded material having physical properties appropriate for the object of the present invention, in cases in which it is desired to obtain a molded material having a low filling rate and in which large nodes (unstretched portions) remain, and conventional PTFE alone has been selected as the starting material, it is necessary for the stretching rate to be no more than 150%/sec in the first direction, and preferably no more than 80%/sec, and stretching to be no more than 500%/sec in the second direction. However, the filling rate structure of molded materials obtained in this manner is easily impaired by external forces.

In the present embodiment, due to the presence of the non-fibril-forming and non-hot-melt-processable component, the aforedescribed phenomenon is more pronounced at low stretching rates. As a result, the stretching rate range that can be applied can be expanded to a stretching rate of no more than 600%/sec, preferably no more than 150%/sec, in the first direction, and a stretching rate of no more than 600%/sec in the second direction. Due to the presence of the non-fibril-forming and hot-melt-processable component, the structure can be maintained even after post-processing.

The porous film 1 obtained in this manner is preferably subjected to heat fixation to obtain good mechanical strength and dimensional stability. The temperature during heat fixation may be at or above the PTFE melting point or less than the PTFE melting point, and preferably 250-400° C.

In the aforedescribed step (c), it is preferable for the filtration medium 10 to be further shaped into a zigzag configuration by alternately mountain-folding and valley-folding the filtration medium 10, by carrying out a sequence of formation of a mountain fold and at least one of the plurality of projections, and formation of a valley fold and at least one other projection of the plurality of projections, in the stated order, while conveying the filtration medium 10 in one direction. In so doing, the embossing process and the pleating process can be carried out simultaneously on the filtration medium 10. There is no particular limitation as to the number of projections formed between mountain folds and valley folds, as long as there is one or more.

This method of carrying out the embossing process and the pleating process simultaneously can be implemented, for example, using a pair of rollers having raised and depressed patterns formed on their surfaces, for carrying out the embossing process and the pleating process. More specifically, the raised and depressed patterns are constituted by raised portions or depressed portions furnished to the surface of one of the rollers of the pair of rollers, and depressed portions or raised portions furnished to the surface of the other roller, at locations corresponding to the former raised portions or depressed portions. The embossing process and the pleating process are carried out by conveying the filtration medium so as to pass between this pair of rollers.

EXAMPLES

The present invention is described in more specific terms below through examples.

(1) Fabrication and Evaluation of Porous Film and Filtration Medium

Example 1

66.5 wt % (polymer conversion) of a PTFE aqueous dispersion having an SSG of 2.160 (PTFE-A), 28.5 wt %

(polymer conversion) of a low-molecular weight PTFE aqueous dispersion having melt viscosity, measured at 380° C. using a flow tester method, of 20,000 Pa·s (PTFE-B), and 5 wt % (polymer conversion) of an FEP aqueous dispersion having a melting point of 215° C. were mixed, 500 ml of a 1% aluminum nitrate aqueous solution was added as a coagulant, and co-coagulation was carried out by stirring. The powder which formed was drained with a sieve, then further dried in a hot air dryer at 135° C. for 18 hours, to obtain a mixed powder of the aforedescribed three components.

Next, a hydrocarbon oil (IP SOLVENT 2028 made by Idemitsu Kosan Co. Ltd.) was added as an extrusion liquid lubricant, in an amount of 25 weight parts to 100 weight parts of the mixture, and mixed in at 20° C. Next, the mixture obtained thereby was extruded using a paste extruder, to obtain a sheet-shaped molded material. To the distal end of the paste extruder was attached a sheet die in which was formed a rectangular extrusion opening having 2 mm in length at the short sides by 150 mm in length at the long sides. This sheet-shaped molded material was molded into a film profile by a calender roll heated to 70° C., obtaining a fluororesin film. This film was passed through a 250° C. hot air dryer to evaporate out the hydrocarbon oil and obtain an unbaked fluororesin film in the form of a strip of average thickness of 200 μm and average width of 150 mm. Next, the unbaked fluororesin film was stretched by a stretch ratio of 5 in the lengthwise direction at a stretching rate of 38%/sec. The stretching temperature was 300° C. Next, using a tenter capable of continuously clipping the stretched unbaked film, the film was stretched by a stretch ratio of 13.5 in the widthwise direction at a stretching rate of 330%/sec, and heat fixation was carried out. At this time, the stretching temperature was 290° C. and the heat fixation temperature was 390° C. A porous film (filling rate: 4.2%, average fiber diameter: 0.150 μm, thickness: 38.6 μm) was obtained thereby. In the manner described below, the film thickness of the porous film when prescribed pressure was applied to the porous film was measured and the rate of decline in thickness was calculated, as well as measuring the pressure loss and calculating the PF value.

Next, air-permeable support materials made from spun-bonded nonwoven fabric comprising fibers of core-in-sheath structure having a PET core and a PE sheath (average fiber diameter: 24 μm, weight: 40 g/m$^2$, thickness: 0.2 mm) were joined to both sides of the obtained porous film 1 by thermal fusion bonding using a laminating apparatus, to obtain a filtration medium. In the manner described below the filtration medium so obtained was measured for pressure loss before and after the embossing process, respectively, and the change in pressure loss was calculated, as well as measuring the PE value before and after the embossing process, respectively, and calculating the change in the PE value.

Example 2

Processing and evaluation were carried out in same manner as in Example 1, except for using PFA having a melting point of 310° C. (NEOFLON PFA made by Daikin Industries) as the non-fibril-forming and hot-melt-processable component in Example 1.

Comparative Example 1

Processing and evaluation were carried out in same manner as in Example 1, except for using a starting material containing the PTFE-A aqueous dispersion only, and not containing the PTFE-B aqueous dispersion or the FEP aqueous dispersion in Example 1, while making appropriate modifications to the fabrication conditions to produce a pressure loss comparable to that of the porous films of Examples 1 and 2. The reason for modifying the fabrication conditions was that fabrication under the same fabrication conditions as in Examples 1 and 2 resulted extremely high pressure loss on the part of the porous film so obtained.

Reference Example 1

Processing and evaluation were carried out in same manner as in Example 1, except for using a starting material comprising the PTFE-A aqueous dispersion and the PTFE-B aqueous dispersion, and not containing the FEP aqueous dispersion, in Example 1. As in Comparative Example 1, appropriate modifications to the fabrication conditions were made, to produce a pressure loss comparable to that of the porous films of Examples 1 and 2.

Reference Example 2

Processing and evaluation were carried out in same manner as in Example 1, except for using a starting material comprising the PTFE-A PTFE aqueous dispersion and the FEP aqueous dispersion, but not containing the PTFE-B aqueous dispersion, in Example 1. As in Comparative Example 1, appropriate modifications to the fabrication conditions were made, to produce a pressure loss comparable to that of the porous films of Examples 1 and 2.

Example 3

Processing and evaluation were carried out in same manner as in Example 1, except for using talc (TALC P2 made by Nippon Talc) in place of the PTFE-B aqueous dispersion in Example 1, and making appropriate modifications to the fabrication conditions.

Example 4

Processing and evaluation were carried out in same manner as in Example 1, except for using mica (PDM-5BY made by Topy Industries) in place of the PTFE-B aqueous dispersion in Example 1, and making appropriate modifications to the fabrication conditions.

Example 5

Processing and evaluation were carried out in same manner as in Example 1, except for using an epoxy resin (EFD-5570 made by DIC) in place of the PTFE-B aqueous dispersion in Example 1, and making appropriate modifications to the fabrication conditions.

Example 6

Two porous films 1 in the same manner as in Example 1 were prepared. As the air-permeable support materials, three spun-bonded nonwoven fabrics comprising fibers of core-in-sheath structure having a PET core and a PE sheath (average fiber diameter: 24 μm, weight: 30 g/m$^2$, thickness: 0.15 mm) were prepared. The two porous films 1 and three spun-bonded nonwoven fabrics so obtained were combined in the order: spun-bonded nonwoven fabric/porous film 1/spun-bonded nonwoven fabric/porous film 1/spun-bonded nonwoven fabric, and these were joined together by thermal fusion bonding using a laminating apparatus, to obtain a filtration medium. In all other respects, processing and evaluation were carried out in same manner as in Example 1.

The weight and thickness of the spun-bonded nonwoven fabrics were adjusted with consideration the relationship of the combined state to that in the other examples.

Example 7

Two porous films 1 in the same manner as in Example 1 were prepared. As the air-permeable support materials, two spun-bonded nonwoven fabrics comprising fibers of core-in-sheath structure having a PET core and a PE sheath (average fiber diameter: 24 μm, weight: 40 g/m², thickness: 0.2 mm) were prepared. The two porous films 1 and two spun-bonded nonwoven fabrics so obtained were combined in the order: spun-bonded nonwoven fabric/porous film 1/porous film 1/spun-bonded nonwoven fabric, and these were joined together by thermal fusion bonding using a laminating apparatus, to obtain a filtration medium. In all other respects, processing and evaluation were carried out in same manner as in Example 1. There were no differences in film thickness, filling rate, or other properties between the porous films 1 of the two layers.

The weight and thickness of the spun-bonded nonwoven fabrics were adjusted with consideration the relationship of the combined state to that in the other examples.

(Film Thickness Reduction Speed of Porous Film)

Using a measuring device having a flat gauge head (part no. 101117) having 10 mm in diameter (bottom surface area: 78.5 mm×2) attached to a digital linear gauge (LGK-0510 made by Mitutoyo Corp.), the change in film thickness when pressure of 6.4 kPa was applied in a perpendicular direction to the surface of the porous film was recorded continuously (0.1 Hz) using a data logger. From the recorded data, the amount of reduction in film thickness was measured for 0.5 second from contact of the gauge head against the film, and the film thickness reduction speed (μm/sec) was calculated.

(Embossability of Filtration Medium)

A pair of 135 mm×200 mm embossing dies (flat plate) were set in a heat pressing machine, and a test sample having a maximum projection height of about 6 mm subsequent to the embossing process was prepared at a pressing pressure of 0.2 MPa, a die temperature of 70° C., and a pressing time of 1 second. The embossed pattern is shown in FIG. 7.

Figure 7:
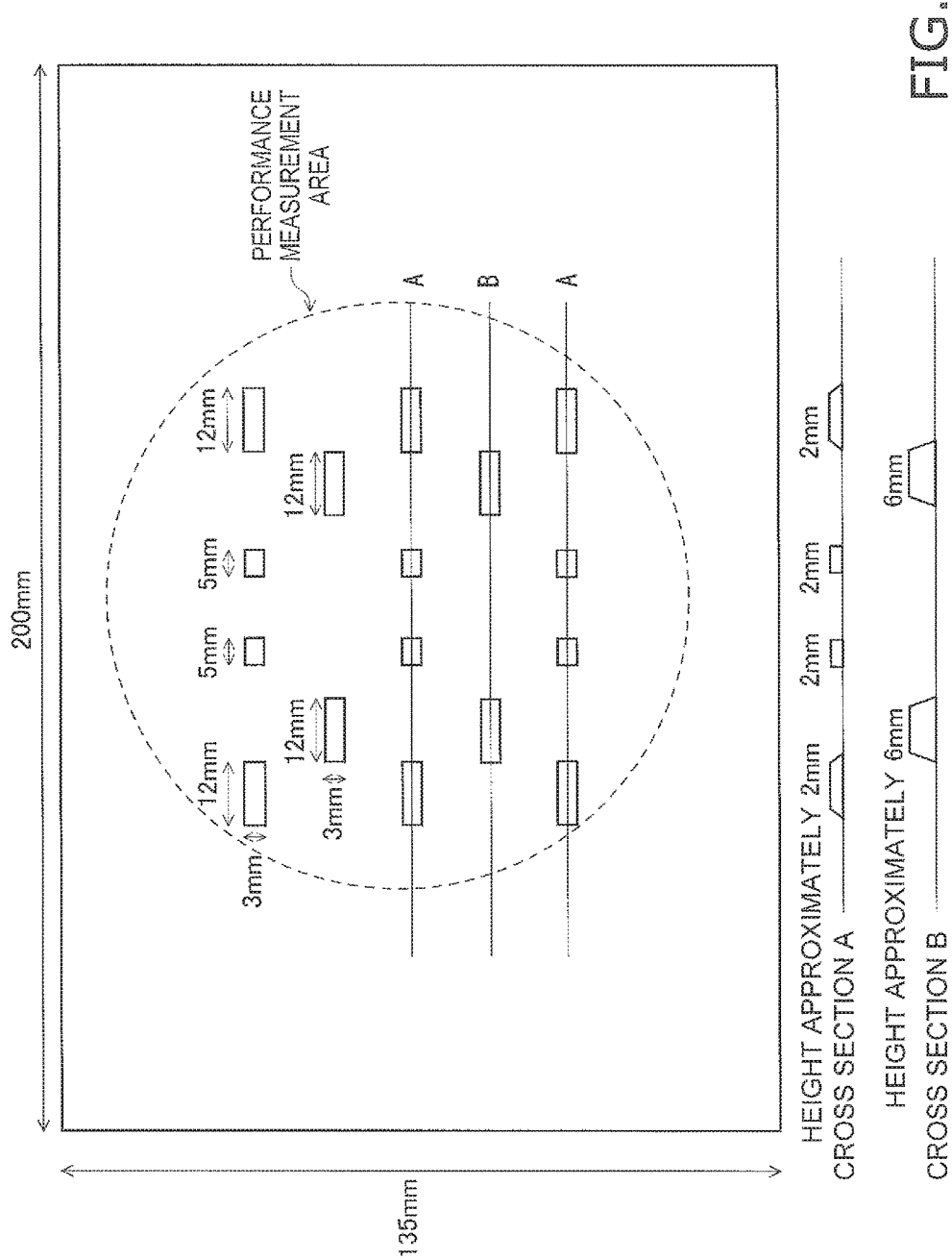
FIG. 7 is a diagram describing a die used in carrying out an embossing process on samples of an example, a prior art example, and a comparative example.

During measurement of filter performance (pressure loss, trapping efficiency) of the test sample, the proportion of embossed areas (total surface area of the bottom surface sections of the protrusions) in the performance measurement area (the broken-line circular area indicated by "performance measurement area" in FIG. 7) was 8.6%.

The pressure loss, trapping efficiency, and PF value of the filtration medium subsequent to the embossing were respectively measured and calculated as described below.

(Pressure Loss and Rate of Change of Porous Film and Filtration Medium)

A test sample was set in a filter filtration medium holder of cylindrical shape with an inside diameter of 100 cm², the inlet side was pressurized with a compressor, and the flow of air was adjusted to bring the filtration medium passage speed of the air to 5.3 cm/sec. Using a manometer, the pressure was measured at the upstream side and the downstream side of the test sample, and the difference in pressure between upstream and downstream was obtained by way of the pressure loss of the porous film 1. The pressure loss was calculated in the same manner, using a filtration medium fabricated using the same porous film.

The rate of change (%) of pressure loss of the filtration medium before and after the embossing process was calculated according to the following equation.

Rate of change (%)=((pressure loss (Pa) of filtration medium after embossing process−pressure loss (Pa) of filtration medium before embossing process)/pressure loss (Pa) of filtration medium before embossing process)×100

(Trapping Efficiency of Porous Film and Filtration Medium)

In the same way as measurement of pressure loss of the porous film and filtration medium, a test sample was set in a filter filtration medium holder of cylindrical shape with an inside diameter of 100 cm², the inlet side was pressurized with a compressor, and the flow of air was adjusted to bring the filtration medium passage speed of the air to 5.3 cm/sec. PSL (polystyrene latex) particles having 0.3 μm in diameter were introduced at the upstream side of the porous film or filtration medium, and the concentrations of the PSL particles at the upstream side and the downstream side of the porous film or filtration medium were measured with a light-scattering particle counter. The trapping efficiency of the porous film and filtration medium was calculated according to the following equation. The trapping efficiency of the porous film and filtration medium after the embossing process was calculated in the same way.

Trapping efficiency (%)=(1−(CO/CI))×100

In the equation, CO is the number of PSL particles passing through the porous film or filtration medium.

CI is the number of PSL particles supplied to the porous film or filtration medium.

(PF Value and Rate of Change of Porous Film and Filtration Medium)

The PF value was calculated from the pressure loss and trapping efficiency of porous film and filtration medium, according to the following equation.

$PF$ value (kPa$^{-1}$)=(−log(permeability)/pressure loss)×1,000

In the equation, permeability (−)=(100−trapping efficiency (%))/100

The rate of change (%) of the PF value of the filtration medium before and after the embossing process was calculated according to the following equation.

Rate of change (%)=(($PF$ value of filtration medium after embossing process−$PF$ value of filtration medium before embossing process)/$PF$ value of filtration medium before embossing process)×100

Measured results and calculated results for Examples 1-7, Comparative Example 1, and Reference Examples 1 and 2 are given in Table 1. Here, the items of "fabrication parameters," "porous film filling rate (%)," and "porous film thickness" are values obtained by evaluating one of the two porous films in Example 6 and Example 7.

TABLE 1

|  |  | Ex. 1 | Ex. 2 | Comp. Ex. 1 | Ref. Ex. 1 | Ref. Ex. 2 | Ex. 3 | Ex. 4 | Ex. 5 | Ex. 6 | Ex. 7 |
|---|---|---|---|---|---|---|---|---|---|---|---|
| Starting Material | Component A | PTFE-A | PTFE-A | PTFE-A | PTFE-A | PTFE-A | PTFE-A | PTFE-A | PTFE-A | PTFE-A | PTFE-A |
|  | /Wt % | /66.5 | /66.5 | /100 | /70 | /90 | /66.5 | /66.5 | /66.5 | /66.5 | /66.5 |
|  | Component B | PTFE-B | PTFE-B |  | PTFE-B |  | Talc | Mica | Epoxy | PTFE-B | PTFE-B |
|  | /Wt % | /28.5 | /28.5 |  | /30 |  | /28.5 | /28.5 | /28.5 | /28.5 | /28.5 |
|  | Component C | FEP | PFA |  |  | FEP | FEP | FEP | FEP | FEP | FEP |
|  | /Wt % | /5 | /5 |  |  | /10 | /5 | /5 | /5 | /5 | /5 |
| Fabrication parameters | Adjuvant amt. (wt. parts) | 25 | 25 | 30 | 25 | 25 | 29 | 29 | 29 | 25 | 25 |
|  | Unbaked film thickness (μm) | 200 | 200 | 200 | 200 | 120 | 200 | 200 | 200 | 200 | 200 |
|  | Longitudinal Stretch Temp (° C.) | 300 | 300 | 300 | 300 | 300 | 300 | 300 | 300 | 300 | 300 |
|  | Ratio (x) | 5 | 5 | 5 | 5 | 5 | 5 | 5 | 5 | 5 | 5 |
|  | Stretch speed (%/sec) | 38 | 38 | 38 | 38 | 38 | 38 | 38 | 38 | 38 | 38 |
|  | Transverse stretch Temp (° C.) | 290 | 290 | 290 | 290 | 290 | 290 | 290 | 290 | 290 | 290 |
|  | Ratio (x) | 13.5 | 13.5 | 24 | 20 | 20 | 20 | 20 | 20 | 13.5 | 13.5 |
|  | Stretch speed (%/sec) | 330 | 330 | 330 | 330 | 330 | 330 | 330 | 330 | 330 | 330 |
|  | Elongation area ratio (x) | 67.5 | 67.5 | 120 | 100 | 100 | 100 | 100 | 100 | 67.5 | 67.5 |
|  | Heat fixation temp. (° C.) | 390 | 390 | 390 | 390 | 390 | 390 | 390 | 390 | 390 | 390 |
| Porous film filling rate (%) |  | 4.2 | 4.3 | 5.4 | 4.1 | 5.5 | 5 | 5.1 | 4.9 | 4.2 | 4.2 |
| Porous film thickness | Initial (μm) | 38.6 | 39.2 | 7.8 | 29.6 | 11 | 41 | 41.3 | 39.7 | 38.6 | 38.6 |
|  | After 0.5 sec at 6.4 kPa pressure (μm) | 38.1 | 38.6 | 6.5 | 28.1 | 9.5 | 40.7 | 40.9 | 39.2 | 38.1 | 38.1 |
|  | Thickness red, speed (μm/s) | −1 | −1.2 | −2.6 | −3 | −3 | −0.6 | −0.9 | −1 | −1 | −1 |
| Pressure loss | Porous film (Pa) | 67 | 82 | 133 | 71 | 80 | 133 | 140 | 125 | 67 | 67 |
|  | Filtration medium structure (A: porous film, B: nonwoven) | B/A/B | B/A/B | B/A/B | B/A/B | B/A/B | B/A/B | B/A/B | B/A/B | B/A/B/A/B | B/A/A/B |
|  |  | 3 layer | 3 layer | 3 layer | 3 layer | 3 layer | 3 layer | 3 layer | 3 layer | 5 layer | 4 layer |
|  | Fltr med pre-emboss (Pa) | 77 | 96 | 169 | 105 | 117 | 141 | 145 | 131 | 155 | 154 |
|  | Fltr med post-emboss (Pa) | 84 | 106 | 208 | 146 | 156 | 154 | 158 | 143 | 169 | 168 |
|  | Rate of change (%) | 9 | 10 | 23 | 39 | 33 | 9 | 9 | 9 | 9 | 9 |
| PF value | Porous film (kPa$^{-1}$) | 27.1 | 28.2 | 32.9 | 24.7 | 24.8 | 23.7 | 26.2 | 25.6 | 27.1 | 27.1 |
|  | Fltr med pre-emboss (kPa$^{-1}$) | 25.3 | 26.2 | 23.3 | 18.8 | 19.6 | 22 | 25 | 24.1 | 24.9 | 25 |
|  | Fltr med pst-emboss (kPa$^{-1}$) | 23 | 23.5 | 17.9 | 13 | 13.9 | 20 | 22.6 | 21.8 | 22.8 | 22.8 |
|  | Rate of change (%) | −9 | −10 | −23 | −31 | −29 | −9 | −10 | −10 | −8 | −9 |

As indicated in Table 1, in Comparative Example 1, which does not include the non-fibril-forming and non-hot-melt-processable component (component B) and the non-fibril-forming and hot-melt-processable component (component C), pressure loss and the PF value declined greatly due to the embossing process. Similarly, in Reference Example 1, which includes the non-fibril-forming and non-hot-melt-processable component (component B) but does not include the hot-melt-processable component (component C), and in Reference Example 2, which does not include the non-fibril-forming and non-hot-melt-processable component (component B) but includes the hot-melt-processable component (component C), pressure loss and the PF value declined greatly due to the embossing process.

On the other hand, as indicated in Table 1, in Examples 1-7, which include both the non-fibril-forming and non-hot-melt-processable component (component B) and the non-fibril-forming and hot-melt-processable component (component C), the change in pressure loss and the PF value was minimal, and the decline in filter performance was minimized. While the thickness of the porous film in the filtration medium subsequent to the embossing process could not be measured, considering the thickness reduction speed indicated in the table, it is thought that the internal structures of the nodes were reinforced by the hot-melt-processable component (component C), greatly minimizing deformation of the nodes with respect to the load bearing on the filtration medium due to the embossing process.

(2) Fabrication and Evaluation of Air Filter Unit

Next, the filtration media of the aforedescribed Examples 1-7, Comparative Example 1, and Reference Examples 1 and 2 were subjected to an embossing process and pleating process as described below, to fabricate filter packs, and the filter packs were further fabricated into air filter units.

In the embossing process, dot-shaped projections 21A-21F of the shape and dimensions shown in FIG. 4 were formed. The shape of the dot-shaped projections was a frusto-pyramidal shape, six of these dot-shaped projections being formed in single rows in the MD direction (lengthwise direction) of the filtration media, and the heights of the projections from the apical portion (the apical portion of the mountain fold) to the valley portion (the valley bottom portion of the valley fold) of the folds being 2.0 mm, 1.8 mm, 1.5 mm, 1.3 mm, 1.0 mm, and 0.8 mm. 23 rows of dot-shaped projections were formed in single rows in the CD direction (transverse direction) of the filtration media on one surface (i.e., convex projections only), without intentionally varying the heights thereof within the same row. The widths (length in the CD direction) of the dot-shaped projections from the apical portion to the valley portion were 5.0 mm, 4.8 mm, 4.6 mm, 4.4 mm, 4.2 mm, and 4.0 mm. The bottom-side lengths of the dot-shaped projections from the apical portions to the valley portions of the folds were constant at 7 mm for each. The rise angles of the dot-shaped projections from the apical portions to the valley portions of the folds were 45, 42, 37, 33, 27, and 22 degrees. As shown in FIG. 3, these dot-shaped projections were arrayed so as to appear in alternating fashion in the CD direction on the front and back surfaces. The filter medium was placed between a pair of rollers having raised and depressed patterns formed on their surfaces in such a way as to form dot-shaped projections of the form described above, and fed out from between the rollers to carry out the embossing process. The temperature of the roller surfaces was set to 80° C. The filter medium having undergone the embossing process was folded into a zigzag configuration at a fold width of 125 mm using a reciprocating pleating machine, to fabricate a filter pack.

The filter pack fabricated in this manner was sealed into an extruded aluminum frame together with a urethane sealant, and an air filter unit having outside diameter dimensions of 610 mm (width)×610 mm (height)×150 mm (depth) was fabricated. Air filter units constructed using the filter media of Examples 1-7, Comparative Example 1, and Reference Examples 1 and 2 (Examples 6-12, Comparative Example 2, Reference Examples 3 and 4) were measured for pressure loss, the PF values were calculated, and the units were subjected to leak tests, as described below.

(Air Filter Unit Pressure Loss)

The fabricated air filter units were installed in rectangular ducts, the flow of air was adjusted to bring the air flow to 10 m$^3$/minute, and the pressures at the upstream side and the downstream side of the air filter units were measured with a manometer, to obtain the difference in pressure between upstream and downstream, by way of the pressure loss of the air filter unit.

(Trapping Efficiency of Air Filter Unit)

In the same way as measurement of pressure loss of the air filter units, the air filter units were installed in rectangular ducts, and the flow of air was adjusted to bring the air flow to 10 m$^3$/minute. PSL particles 0.3 μm in diameter were introduced at the upstream side of the air filter units, and the concentrations of the PSL particles at the upstream side and the downstream side of the air filter units were measured with a light-scattering particle counter. The permeability and trapping efficiency of the air filter units were calculated by equations similar to those for permeability and trapping efficiency of the filter media.

(Air Filter Unit Leak Test Method)

Leakage of the air filter units was measured in accordance with JIS B9927. The allowable permeability PL of a filter, which serves as the criterion for the leak determination, was set with the acceptable scaling factor K in the following equation at 10.

$$PL\ (\%) = (100 - \text{trapping efficiency of air filter unit}\ (\%)) \times K$$

Measured results and calculated results for Examples 6-12, Comparative Example 2, and Reference Examples 3 and 4 are given in Table 2.

As shown in Table 2, the air filter units fabricated using the filter media of Examples 1-7 were improved in terms of the frequency of leak defects, as compared with the air filter units fabricated using the filter media of Comparative Example 1 and Reference Examples 1 and 2. While the micro behavior of porous films under application of compressing pressure cannot be observed, it is thought that the nodes are hard due to the porous film containing the non-fibril-forming and hot-melt-processable component (component C), thereby improving the strength of the porous film, as well as suppressing the formation of perforating passages in the thickness direction due to reduction in porous film thickness.

While the embossed air filter filtration medium, filter pack, air filter unit, and method for manufacturing an embossed air filter filtration medium of the present invention have been described in detail hereinabove, the present invention is not limited to the aforedescribed embodiments, and various improvements and modifications are possible without departing from the spirit of the present invention.

What is claimed is:

1. An embossed air filter filtration medium for trapping dust in a stream of air, the embossed air filter filtration medium comprising:
    an air filter filtration medium having
        at least one porous film including
            a fibril-formable polytetrafluoroethylene,
            a non-fibril-forming and non-hot-melt-processable component, and
            a non-fibril-forming and hot-melt-processable component having a melting point below 320° C., and
        a plurality of air-permeable support materials supporting the at least one porous film,
    surfaces of both sides of the air filter filtration medium being formed by two air-permeable support materials of the plurality of air-permeable support materials, and
    the air filter filtration medium being provided with a plurality of embossed projections.

2. The embossed air filter filtration medium according to claim 1, wherein
    the non-fibril-forming and hot-melt-processable component content is 0.1 wt % to less than 20 wt % of the at least one porous film.

3. The embossed air filter filtration medium according to claim 1, wherein

TABLE 2

| | Ex. 6 | Ex. 7 | Comp. Ex. 2 | Ref. Ex. 3 | Ref. Ex. 4 | Ex. 8 | Ex. 9 | Ex. 10 | Ex. 11 | Ex. 12 |
|---|---|---|---|---|---|---|---|---|---|---|
| Filter material | Ex. 1 filter medium | Ex. 2 filter medium | Cmp. Ex. 1 filter medium | Ref. Ex. 1 filter medium | Ref. Ex. 2 filter medium | Ex. 3 filter medium | Ex. 4 filter medium | Ex. 5 filter medium | Ex. 6 filter medium | Ex. 7 filter medium |
| No. of filters made (units) | 10 | 10 | 10 | 10 | 10 | 10 | 10 | 10 | 10 | 10 |
| Effective filtration area (m$^2$) | 18 | 18 | 18 | 18 | 18 | 18 | 18 | 18 | 18 | 18 |
| Air flow (m$^3$/min) | 10 | 10 | 10 | 10 | 10 | 10 | 10 | 10 | 10 | 10 |
| Pressure loss (Pa) | 27-28 | 31-33 | 48-51 | 38-41 | 39-41 | 39-41 | 39-42 | 37-39 | 41-45 | 41-44 |
| Trapping efficiency (%) | 99.98-99.99 | 99.99-99.993 | 99.995-99.999 | 99.98-99.992 | 99.99-99.992 | 99.992-99 995 | 99.992-99.995 | 99.99-99.994 | 99.9995-99.9999 | 99.9995-99.9999 |
| No. of leaking filters (units) | 0 | 0 | 3 | 2 | 2 | 0 | 0 | 0 | 0 | 0 | the non-fibril-forming and hot-melt-processable component is a fluororesin.

4. The embossed air filter filtration medium according to claim 3, wherein
the fluororesin is a tetrafluoroethylene-perfluoroalkyl vinyl ether copolymer, a tetrafluoroethylene-hexafluoropropylene copolymer, or a mixture thereof.

5. The embossed air filter filtration medium according to claim 1, wherein
the non-fibril-forming and non-hot-melt-processable component is a low-molecular weight polytetrafluoroethylene, a thermosetting resin, an inorganic filler, or a mixture thereof.

6. A filter pack including the embossed air filter filtration medium according to claim 1,
the embossed air filter filtration medium has a folded configuration with alternate mountain folding and valley folding so as to assume a zigzag configuration.

7. The filter pack according to claim 6, wherein
the plurality of embossed projections of the embossed air filter filtration medium include a plurality of pairs of mutually facing projections formed on two facing surfaces of the embossed air filter filtration medium, which have been mountain-folded or valley-folded to face one another.

8. The filter pack according to claim 7, further comprising a spacer arranged to maintain spacing between two of the projections arranged so as to face one another.

9. An air filter unit including the filter pack according to claim 6, the air filter unit further comprising
a frame arranged and configured to retain the filter pack, the filter pack being sealed in the frame using a sealant.

10. A method for manufacturing an embossed air filter filtration medium adapted to trap microparticles in a stream of air, the method comprising:
providing at least one porous film including
a fibril-formable polytetrafluoroethylene,
a non-fibril-forming and non-hot-melt-processable component, and
a non-fibril-forming and hot-melt-processable component having a melting point below 320° C.;
laminating air-permeable support materials on the at least one porous film to form an air filter filtration medium with surfaces of both sides of the air filter filtration medium being formed by the air-permeable support materials; and
embossing the air filter filtration medium to form a plurality of projections on the air filter filtration medium.

11. The method for manufacturing an embossed air filter filtration medium according to claim 10, wherein
the embossing includes
alternately mountain-folding and valley-folding the embossed air filter filtration medium to form a zigzag configuration; and
while conveying the air filter filtration medium in one direction, repeatedly carrying out in order
formation of a mountain fold and at least one of the plurality of projections, and
formation of a valley fold and at least one other projection of the plurality of projections.

12. The embossed air filter filtration medium according to claim 2, wherein
the non-fibril-forming and hot-melt-processable component is a fluororesin.

13. The embossed air filter filtration medium according to claim 12, wherein
the fluororesin is a tetrafluoroethylene-perfluoroalkyl vinyl ether copolymer, a tetrafluoroethylene-hexafluoropropylene copolymer, or a mixture thereof.

14. The embossed air filter filtration medium according to claim 2, wherein
the non-fibril-forming and non-hot-melt-processable component is a low-molecular weight polytetrafluoroethylene, a thermosetting resin, an inorganic filler, or a mixture thereof.

15. The embossed air filter filtration medium according to claim 3, wherein
the non-fibril-forming and non-hot-melt-processable component is a low-molecular weight polytetrafluoroethylene, a thermosetting resin, an inorganic filler, or a mixture thereof.

16. A filter pack including the embossed air filter filtration medium according to claim 3,
the embossed air filter filtration medium has a folded configuration with alternate mountain folding and valley folding so as to assume a zigzag configuration.

17. A filter pack including the embossed air filter filtration medium according to claim 5,
the embossed air filter filtration medium has a folded configuration with alternate mountain folding and valley folding so as to assume a zigzag configuration.

* * * * *